United States Patent
McGrail et al.

[11] Patent Number: 5,840,424
[45] Date of Patent: Nov. 24, 1998

[54] CURABLE COMPOSITE MATERIALS

[75] Inventors: Patrick Terence McGrail, Saltburn; Stephen Derek Jenkins, Middlesbrough, both of England

[73] Assignee: Fiberite, Inc., Tempe, Ariz.

[21] Appl. No.: 495,552

[22] PCT Filed: Feb. 18, 1994

[86] PCT No.: PCT/GB94/00333

§ 371 Date: Oct. 17, 1995

§ 102(e) Date: Oct. 17, 1995

[87] PCT Pub. No.: WO94/19398

PCT Pub. Date: Sep. 1, 1994

[30] Foreign Application Priority Data

Feb. 19, 1993 [GB] United Kingdom .................. 9303314
May 20, 1993 [GB] United Kingdom .................. 9310436

[51] Int. Cl.⁶ ...................................................... B32B 9/00
[52] U.S. Cl. .................... 428/367; 427/385.5; 427/386; 428/368; 428/375; 428/394; 428/395
[58] Field of Search .................. 427/385.5, 386; 428/367, 368, 375, 394, 395

[56] References Cited

U.S. PATENT DOCUMENTS

Re. 35,081  11/1995  Quigley .............................. 428/408 X
3,881,977    5/1975  Dauksys ................................. 156/242
4,894,012    1/1990  Goldberg et al. ............... 260/998.11 X

FOREIGN PATENT DOCUMENTS 0244819   12/1988   European Pat. Off. .
0384712    8/1990   European Pat. Off. .
2091621    1/1972   France .
58-162317  9/1983   Japan .
2204888   11/1988   United Kingdom .

*Primary Examiner*—Michael Lusignan
*Attorney, Agent, or Firm*—Gray Cary Ware & Freidenrich

[57] ABSTRACT

A curable composite material has a thermosettable resin matrix and a continuous-fibre reinforcement impregnated by said matrix. The fibres of the reinforcement are sized with an aromatic thermoplastic resin, preferable selected from polysulphones, imidized polysulphones and polyisoimides.

22 Claims, 20 Drawing Sheets a)

b)

c)

533002  15KV  430um 532995  15KV  600um

CURABLE COMPOSITE MATERIALS

This invention relates to curable composite materials.

Continuous-fibre reinforced thermoset resin composite materials have been used for many applications, especially in the aerospace industry in which strength-to-weight ratios are particularly important. Some of these applications involve significant thermal cycling of the parts made from the composite materials. For example, the composite materials have been used in the manufacture of jet engine components wherein the parts are subjected to thermal cycling between ambient temperatures and the relatively high continuous use temperature ("CUT") experienced by the engine components in flight. Currently, carbon fibre/epoxy resin composite materials, which typically have a CUT of 130° C. –150° C., are used for parts subjected to relatively low CUT regimes in the engine.

However, efforts are now being made to develop such composite materials for higher CUT regimes. Thermosetting polyimide resins offer significant improvement in CUTs. NASA has developed such a thermosetting polyimide resin with a CUT of up to 316° C. in atmospheric air. This resin is commercially available under the designation PMR-15. Developments of the PMR-15 resin have resulted in resins which have even higher CUTs. PMR-15, and its developments, have been widely reviewed in the literature, for example T T Serafini, Proceedings of 5th International Conference on Composite Materials, 1007–1023, Metal Soc 1985, AIME, D Wilson, British Polymer Journal, 20(5), 405–416, 1988 and D A Scola and J H Vontell, Chemtech 112–121, February 1989.

However, in applications such as jet engines, PMR composite materials do exhibit some problems. For example, one problem is their poor resistance to microcracking resulting from thermal cycling; see for example M Simpson, P M Jacobs and F R Jones, Composites, 22(2), 89–98, 99–104 and 105–112, 1991, F Jones and Z Xiang, "Aspects of the Thermal Degradation of PMR-15 Based Composites" presented at Third European Conference on Composite Materials, March 1989 and D Wilson, J K Wells, J N Hay, D Lind, G A Owens and F Johnson, SAMPE Journal, 35–42, May/June 1987.

The microcracking arises from thermal strains which develop within the composite material on cooling from the cure temperatures (typically 300° C. –330° C. for PMR resins). The strains originate in unidirectional laminates owing to the mismatch between the coefficients of thermal expansion of the fibres and the matrix resin. In angle ply laminates, this effect is compounded by the anisotropy of the various plies with respect to thermal expansion. Thus, it can be appreciated that, for (0,90) laminates, ie as in woven fabrics which constitute a significant proportion of continuous-fibre reinforced composite materials, the thermal stresses, and hence the potential for microcracking, are at their greatest. The subsequent thermal cycling experienced by the composite materials as, for example, a jet engine component, results in the thermal strains repeatedly being applied to the component and hence promotes microcracking in the component. Owing to the characteristic brittleness of thermoset resins, the microcracking will, at best, compromise component mechanical performance and, at worst, may lead to catastrophic component failure.

Various proposals to alleviate the problem of microcracking in such composite materials have been made. For example, in the Wilson et al reference above (SAMPE Journal, 35–42, May/June 1987), the effects of cure temperatures for PMR-15/(0,90) carbon fibre fabric laminates have been investigated. The laminates were subjected to thermal cycling from –196° C. to 280° C. for 20 cycles. It was concluded that curing at 280° C. –290° C. substantially reduced microcracking without unduly affecting mechanical properties of the composite material. However, the thermal oxidative stability ("TOS") of the composite materials appeared to be slightly lowered despite being studied at only 300° C., well below the normal CUT for the composite materials. Additionally, the glass transition temperature, Tg, of the materials was significantly lowered as compared to the higher temperature cured materials.

Blend toughening the PMR-15 resin matrix using thermoplastics has also been suggested, see for example inter alia R H Pater and C D Morgan, SAMPE Journal 24(5), 25–32, 1988. Such toughened composite materials exhibited good, ie low, transverse microcrack (TVM) density/inch after 1500 cycles over the range –156° C. to 288° C. However, it will be appreciated that such matrices are chemically fundamentally different from PMR-15 which would require re-qualification of the materials for use in aerospace applications. Additionally, the ease of processing such composites, ie removing residual solvents owing to the presence of significant quantities of thermoplastic polymer, may be problematical.

The Wilson reference above (British Polymer Journal, 20(5), 405–416, 1988) discusses the effect of fibre sizes on properties of the composite materials. It indicates that polyimide sizes, apparently thermosetting sizes, are similar in effect to epoxy sizes.

GB-A-2086444 also refers to composite materials in which the fibres may be sized. This document is concerned with achieving effective spreading of unidirectional tows of fibres in preparation for melt impregnating the spread fibres with a matrix thermosetting or thermoplastic resin. It teaches that, as such tows of fibres are usually supplied with a size on the fibres which tends to hold the fibres in the tow together as a coherent bundle, to achieve effective spreading of the fibres it is necessary to remove the size. Consequently, the size is removed from the fibres by passing the tow(s) into a solvent bath which dissolves the size from the fibres, the fibres are then spread and dried to remove the solvent. Following this treatment, the spread fibres are subjected to a melt impregnation operation using thermoset or thermoplastic resins. As an option, the document suggests the fibres can be held in the spread condition by re-applying a size to the fibres in a quantity sufficient to tack the individual fibres in the spread tow(s) together. The size is re-applied to the fibres either by the solvent containing a size or by dipping in a following solvent/size bath or by spraying the size on to the spread fibres. A very wide list of possible sizes, both thermosetting and thermoplastic resins, are suggested as being usable in this manner, although only an epoxy size used in this manner is exemplified.

It will be appreciated that the problem of thermally-induced microcracking will also occur with other thermoset resin matrix composite materials such as epoxy (CUT of 130° C. –150° C.), cyanate and cyanate esters (CUT of about 180° C.), bismaleimides (CUT of about 215° C.) and phenolic (CUT of about 150° C.) resins. However, owing to the lower CUTs of such resins, the scale of the problem is not as significant as in the higher CUT resin composite materials.

Another problem is the TOS of composite materials. Whilst many materials do exhibit good TOS at their CUT, some degradation of the materials can occur. Consequently, owing to the ever increasing demands for higher performance materials, TOS preferably has to be maintained or, more especially, improved. As discussed above, solutions to other problems such as microcracking may have a deleterious affect on TOS.

Also woven into the equation is the need to solve such problems whilst maintaining or, preferably, enhancing the mechanical properties of the composite materials.

Thus, to improve continuous-fibre reinforced thermoset resin composite materials requires a balance of improving one or more properties of the materials whilst maintaining, or at least not significantly affecting, other properties of the materials.

It is an object of the present invention to provide continuous-fibre reinforced thermoset resin composite materials having improved TOS and/or thermally-induced microcracking properties without significantly affecting, or more preferably improving, other properties of the composite materials such as mechanical properties.

The object of the invention is achieved by the provision of a curable composite material which comprises a thermosettable resin matrix and a continuous-fibre reinforcement impregnated by said matrix, the fibres of said reinforcement being sized with an aromatic thermoplastic resin, preferably an amorphous aromatic thermoplastic resin.

Although the fibres may be any suitable fibres such as glass, carbon or organic polymers, preferably, the fibres are carbon fibres, especially graphite fibres. The reinforcement may be comprised by unidirectionally-disposed fibres or, alternatively, may be comprised by a woven fabric.

The thermosettable resin matrix may be selected from any suitable thermosettable resin. For example, useful thermosettable resins are:

- addition-polymerisation resins such as acrylics, vinyls, and
- unsaturated polyesters;
- formaldehyde condensate resins such as with urea, melamine or phenols;
- cyanate resins;
- cyclobutene resins;
- cyanate ester resins;
- functionalised polyesters, polyamides or polyimides;
- epoxy resins; and
- mixtures of two or more of these.

More particularly, the thermosettable resin matrix is selected from the group consisting of epoxy, cyanate, cyanate esters, bismaleimides, phenol-formaldehyde and polyimides.

In the case of an epoxy resin, it is suitably the product of at least partly curing a resin precursor using a curing agent and possibly also a catalyst. Examples of epoxy resin precursors are typically the mono- or poly-glycidyl derivative of one or more of:

- aromatic diamines
- aromatic monoprimary amines
- aminophenols
- polyhydric phenols
- polyhydric alcohols
- polycarboxylic acids.

Examples of such compounds, which are liquids at ambient temperature, are as follows:

- tetraglycidyl diamino diphenylmethane eg "MY 720" or "MY 721" sold by Ciba-Geigy, viscosity 10–20 Pa s at 50° C.; (MY 721 is a lower viscosity version of MY720 and is designed for higher use temperatures);
- triglycidyl derivative of p-aminophenol (eg "MY 0510" sold by Ciba-Geigy), viscosity 0.55–0.85 Pa s at 25° C.;
- diglycidyl ether of 2,2-bis(4,4'-dihydroxy phenyl) propane (eg "Epikote 828" sold by Shell), preferably of viscosity 8–20 Pa s at 25° C.;
- epoxy Novolak (eg "DEN 431" sold by Dow), varieties in the low viscosity class of which are preferred in making compositions according to the invention;
- bisphenol F, which is in the low viscosity class;

Other epoxy resin precursors include cycloaliphatics such as 3',4'-epoxycyclohexyl-3-4-epoxycyclohexane carboxylate (eg CY 179 sold by Ciba-Geigy) and those in the "Bakelite" range of Union Carbide Corporation.

The curing agent for epoxy resin precursors is preferably an amino compound having a molecular weight up to 500 per amino group, for example an aromatic amine or a guanidine derivative. Particular examples are 3,3'- and 4,4'- diaminodiphenylsulphone, methylenedianiline and dicyandiamide. The total amine content of the curing agent is in the range 70–110% of the stoichiometric requirement of the epoxy resin precursor. Other standard epoxy curing agents such as aliphatic diamines, amides, carboxylic acid anhydrides, carboxylic acids and phenols can be used if desired.

If a catalyst is used, it is typically a Lewis acid, for example boron trifluoride, conveniently as a derivative with an amine such as piperidine or methyl ethylamine. Alternatively it can be basic, for example an imidazole or amine.

We find it advantageous to choose a low viscosity epoxy resin precursor (under 100, for example 0.3–50 Pa s at 25° C.) for at least part of the thermoset resin precursor. There may also be present a proportion of high viscosity (over 100 Pa s at 25° C.) epoxy resin precursor. By keeping the viscosity low or moderately low it becomes easier to ensure good flow behaviour when prepregging continuous fibre and to endow prepregs with tack and drape properties.

In the case of cyanates and cyanate esters, it is preferable to use a polymerisable cyanate ester of the type disclosed in EP-A-0412827A and which is selected from one or more compounds, or oligomeric species thereof, of the group consisting of:

i) compounds of general formula

where Ar is a divalent aromatic radical and Z is a single atom group selected from the class consisting of —O—, —S—, —SO—, —SO$_2$—, and —CR$^1$R$^2$— where R$^1$ and R$^2$ are hydrocarbon groups containing in all up to 12 carbon atoms and optionally are linked to form a ring structure; and ii) compounds of general formula

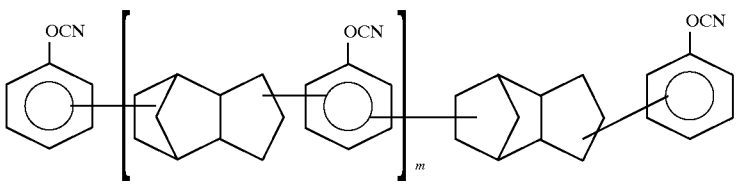

where m is up to 3 and can be fractional.

Catalysts for curing cyanate ester resins include for example a compound of a metal such as copper, zinc or cobalt.

In the case of a BMI, it is suitably of formula I below:

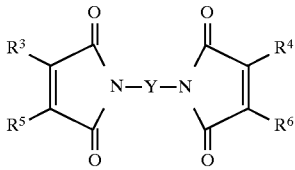

wherein
  $R^3, R^4, R^5$ and $R^6$ are independently —H—, —CH$_3$— or halogen, preferably Cl; and
  Y is $R^7$ or $Ar^1$;
wherein
  $R^7$ is $C_1$ to $C_{12}$ alkylene, straight or branched chain, eg —CH$_2$C(CH$_3$)$_2$CH$_2$CH(CH$_3$)CH$_2$CH$_2$—; and
  $Ar^1$ is alkyl-substituted, eg methyl, 1,3- or 1,4-phenylene or Ph(X—Ph)$_{m1}$;
wherein
  Ph is phenylene;
  m1 is an integer from 0 to 3; and
  X is independently —O—, —S—, —CO—, —SO$_2$—, —CH$_2$—, —C(CH$_3$)$_2$— or —C(CF$_3$)$_2$—; or may be an oligomeric or polymeric reaction product of a Michael addition reaction between a BMI compound of formula I and a diamine of formula II below or an amino acid hydrazide:

$$H_2N—Ph(X—Ph)_{m1}NH_2 \quad\quad II.$$

wherein
  m1 and X are as hereinbefore defined.

Examples of commercially-available Michael addition products are:

Kerimide 601 (available from Rhone Poulenc)
Compimide 796 (available from Technochemie).

Mixtures of the aforementioned BMI compounds may also be used.

In preferred BMI compounds of formula I, Y is $Ar^1$, $Ar^1$ is Ph(X-Ph)$_{m1}$, m1>0, and X is —SO$_2$—. Preferred compounds are 3,3'-bismaleimidodiphenyl-sulphone and 4,4'-bismaleimidodiphenyl-sulphone.

As disclosed in EP-A-0391549A, reactive diluents may be used with the BMI compound, such reactive diluents being compounds containing allyl, isopropenyl, vinyl, acrylic, cyanate and/or epoxide radicals. Similarly, EP-A-0391549A discloses the use of an inhibitor reagent which prevents premature gellation of the BMI compound and can be selected from hydroquinone, benzoquinone, 2,6-ditertbutylphenol, methoxyhydroquinone and other phenols; and discloses suitable cross-linking reagents such as a catalyst of the radical initiator type, eg a peroxide such as tert-butyl perbenzoate and dicumyl peroxide, or of an ionic type, eg diazobicyclooctane.

For specific examples of such reactive diluents, inhibitor reagents and catalysts and the manner in which they are utilised, reference is to be made to EP-A-0391549A.

In the case of phenol-formaldehyde (P-F) resins, these are suitably the reaction products of a phenol and formaldehyde. The phenol may for example be phenol itself, resorcinol, hydroquinone, catechol, alkylated phenols such as cresols and alkylidene bis phenols, naphthols and hydroxy biphenyls. There may be present other formaldehyde reactive materials such as aromatic amines, urea, melamine and guanamines. However, the formaldehyde reactive material is preferably at least 80 mole % monocyclic monohydric phenols.

In accordance with known P-F resin technology, the P-F resin may be present as a "resol", "resitol" or "novolak" reaction product. The "resol" and "resitol", ie A-stage and B-stage, respectively, type of reaction products are formed when using alkaline catalysts to react the formaldehyde and phenols. When an acid catalyst is used, the A-stage is not easily distinguishable and the B-stage product is the "novolak" reaction product.

In the case of polyimides, both condensation polymerisation and addition polymerisation precursors may be utilised. However, it is preferred that addition polymerisation precursors, especially for the PMR-type resins, are used. In particular, the precursors are a mixture of:

a) compounds of formula:

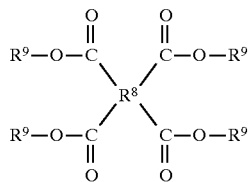

wherein $R^8$ is a tetravalent aryl radical and $R^9$ is alkyl or hydrogen and at least two $R^9$ are alkyl;

b) $H_2N—R^{10}—NH_2$ wherein $R^{10}$ is a divalent aryl radical; and c) compounds of formula:

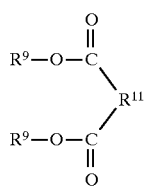

wherein $R^9$ is as defined in a) and at least one $R^9$ is alkyl and $R^{11}$ is a divalent radical of the formula:

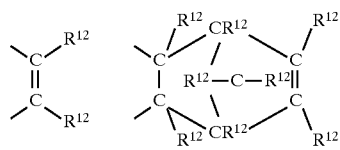

wherein $R^{12}$ is hydrogen or lower alkyl;

the molar ratio of a:b:c being n:(n=1):2, wherein n has a value from 1 to 20, more particularly from 1 to 5, especially from 1.5 to 3; and optionally at least some of c) is replaced by d) a mono aromatic amine having vinyl or ethynyl functionality.

Typically, compounds defined in a) in the preceding paragraph may be readily derived from the dianhydride corresponding to the formula in a). For example, compounds defined in a) may be made from pyromellitic dianhydride, 3,3',4,4'-benzophenonetetracarboxylic dianhydride, 2,3,6,7-naphthalenetetracarboxylic dianhydride, 4,4'-(hexafluoroisopropylidene)-bis(phthalic anhydride), 2,2-bis[4-(4-amino-phenoxy)phenyl]hexafluoro-propane, 1,2,5,6-naphthalenetetracarboxylic dianhydride, 1,4,5,8-naphthalenetetracarboxylic dianhydride, 2,2',3,3'-diphenyltetra-carboxylic dianhydride and bis (3,4-dicarboxyyphenyl)sulphonedianhydride. Typically, the diamines defined in b) in the preceding paragraph may be selected from 4,4'-diaminobiphenyl, 4,4'-methylenedianiline, 4,4',-thiodianiline, 4,4'-oxydianiline, 4,4'diaminodiphenylsulphone, m-phenylenediamine and p-phenylenediamine. Similarly, to the compound defined in a), the compound defined in c) in the preceding paragraph may be readily prepared, either as the mono- or di-ester, from the corresponding anhydride. For example, compounds defined in c) may be made from maleic anhydride citraconic anhydride, 5-norbornene-2,3-dicarboxylic anhydride and methyl-5-norbornene-2,3-dicarboxylic anhydride. Compound d) may be 3-aminostyrene, 4-aminostyrene, 3-ethynylaniline or 4-ethynylaniline.

Particularly useful combinations of a), b), c) and d) are:
dimethyl ester of 3,3',4,4'-benzophenonetetracarboxylic acid (BTDE)/ 4,4'-methylenedianiline (MDA)/methyl ester of 5-norbornene-2,3-dicarboxylic acid (NE)

dimethyl ester of 4,4'-(hexafluoroisopropylidene)bis(phthalic anhydride)/p-phenylenediamine/methyl ester of 5-norbornene-2,3-dicarboxylic acid dimethyl ester of 3,3',4,4'-benzophenonetetracarboxylic acid/ 4,4'-methylenedianiline/methyl ester of 5-norbornene-2,3-dicarboxylic acid in which up to 50 mole % of methyl ester of 5-norbornene-2,3-dicarboxylic acid is replaced by 4-aminostyrene (together with small amounts of N-phenylnadimide to improve the processability of the reaction mixture).

Another useful PMR-type resin which avoids using the potentially carcinogenic methylenedianiline comprises a precursor mixture of:
a) at least one aromatic tetracarboxylic acid, its dianhydride or alkyl diester;
b) a diamine selected from the group consisting of p-phenylenediamine and m-phenylenediamine wherein the diamine is selected such that the molar ratio of p-phenylenediamine to m-phenylenediamine is in the range 0:100 to 95:5; and c) compounds of formula:

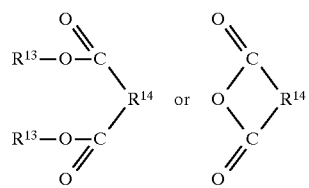

wherein $R^{13}$ are alkyl or hydrogen and at least one $R^{13}$ is alkyl and $R^{14}$ is a divalent radical of the formula:

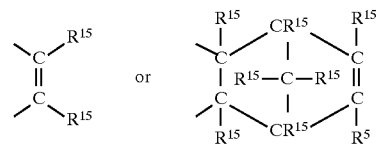

wherein $R^{15}$ is hydrogen or lower alkyl; and, optionally, d) a viscosity modifier;
wherein the molar ratio of a:b:c is n:(n+1):2, wherein n has a value from 1 to 20, more particularly from 1 to 10, especially from 1.5 to 6.5 and wherein, optionally, at least some of c) is replaced by:
e) a component selected from the group consisting of a mono aromatic amine, acid, ester or anhydride having vinyl or ethynyl functionality;
wherein, when said component e) is present and is an amine, the molar ratio of a:b is adjusted to provide sufficient component a) to react with component e).

Preferably, component a) of the MDA-free precursor composition is at least one aromatic tetracarboxylic acid, its dianhydride or alkyl diester selected from the group consisting of 3,3',4,4'-benzophenonetetracarboxylic acid, 4,4'-(hexafluoroisopropylidene)bis(phthalic acid) and 2,2',3,3'-diphenyltetracarboxylic acid, their dianhydrides or alkyl, preferably methyl, diesters; and especially is the dialkyl ester of the corresponding tetracarboxylic acid.

Preferably, component c) of the MDA-free precursor composition is a mono alkyl, preferably methyl, ester of 5-norbornene-2,3-dicarboxylic acid.

One preferred MDA-free precursor composition comprises:
a) at least one $C_1$ to $C_4$ alkyl, preferably methyl, diester of an aromatic tetracarboxylic acid selected from the group consisting of 3,3',4,4'-benzophenonetetracarboxylic acid and 4,4'-(hexafluoroisopropylidene)bis(phthalic acid) and, optionally, a minor proportion of 2,2',3,3'-diphenyltetracarboxylic acid;
b) a diamine selected from the group consisting of p-phenylenediamine and m-phenylenediamine wherein the diamine is selected such that the molar ratio of p-phenylenediamine to m-phenylenediamine is in the range 0:100 to 95:5, preferably 5:95 to 60:40, more preferably 10:90 to 55:45, especially substantially 20:80; and
c) a mono alkyl, preferably methyl, ester of 5-norbornene-2,3-dicarboxylic acid; and, optionally,
d) a viscosity modifier
wherein the molar ratio of a:b:c is n:(n+1):2, wherein n has a value from 1 to 20, more particularly from 1 to 10, especially from 1.5 to 6.5 and wherein, optionally, at least some of c) is replaced by:

e) a mono aromatic amine having vinyl or ethynyl functionality;

wherein, when component e) is present, the molar ratio of a:b is adjusted to provide sufficient component a) to react with component e).

Another preferred MDA-free precursor composition comprises:

a) at least 10 mole % of a $C_1$ to $C_4$ alkyl, preferably methyl, diester of 4,4'-(hexafluoroisopropylidene)bis (phthalic acid) and, optionally, at least one $C_1$ to $C_4$ alkyl, preferably methyl, diester of an aromatic tetracarboxylic acid selected from the group consisting of 3,3',4,4'-benzophenonetetracarboxylic acid and 2,2',3,3'-diphenyltetracarboxylic acid;

b) a mixture of p-phenylenediamine and m-phenylenediamine in the molar ratios 95:5 to 70:30, preferably 90:10 to 75:25, more particularly 85:15 to 75:25, especially substantially 80:20; and c) a mono alkyl, preferably methyl, ester of 5-norbornene-2,3-dicarboxylic acid; and, optionally, d) a viscosity modifier;

wherein the molar ratio of a:b:c is n:(n+1):2, wherein n has a value from 1 to 20, more particularly from 1 to 10, especially from 1.5 to 6.5 and wherein, optionally, at least some of c) is replaced by:

e) a mono aromatic amine having vinyl or ethynyl functionality;

wherein, when component e) is present, the molar ratio of a:b is adjusted to provide sufficient component a) to react with component e).

Preferably, component d) of the MDA-free precursor composition is selected from the group consisting of mono- or bis-nadimides derived respectively from mono, unsubstituted or halo-substituted, amines and unsubstituted diamines of formula $H_2N$—Ph—$(X$—$Ph)_a$—$NH_2$ wherein Ph is 1,3-phenylene or 1,4-phenylene, X is a direct bond, —CO—, —SO—, $SO_2$—, —O—, —$CR^6{}_2$ wherein $R^6$ is —H, —$CH_3$ or —$CF_3$ and a is an integer from 0 to 5, preferably from 0 to 2 and especially is 0 or 1.

More particularly, component d) of the MDA-free precursor composition is at least one compound of formula:

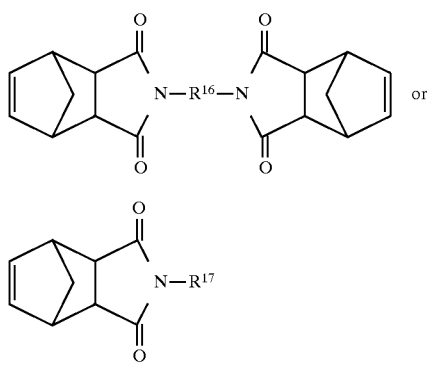

wherein $R^{16}$ is selected from the group consisting of bis (phenyl)methane and 1,3-phenylene and $R^{17}$ is selected from the group consisting of phenyl and 4-fluorophenyl. Preferably, component d) is present in the curable composition in an amount not more than 10%, preferably not more than 5%, especially substantially 2%, by weight based on the weight of components a), b) and c). Preferably, component d) is present in the curable composition in an amount of at least 1% by weight of components a), b) and c).

Preferably, component e) of the MDA-free precursor composition is selected from the group consisting of 3-aminostyrene, 4-aminostyrene, 3-ethynylaniline, 4-ethynylaniline and 3- or 4-allyl-substituted or ethynyl-substituted phthalic mono-alkyl, preferably methyl, ester or anhydride. More preferably, component e) is 4-aminostyrene.

Preferred PMR-type curable compositions have a formulated molecular weight between 1200 and 6000, more preferably between 1200 and 3500.

In a preferred form of the invention, the fibres of said reinforcement are carbon fibres and the thermosettable resin matrix comprises addition polymerisation polyimide precursors, especially as hereinbefore defined.

The amorphous, aromatic thermoplastic resin size on the fibres of said reinforcement substantially uniformly coats the fibres without significantly tacking the fibres together. To achieve such a uniform coating, the thermoplastic resin is selected to have a number average molecular weight (Mn) in the range 1500 to 30000, more particularly 3000 to 20000 and especially 3000 to 15000. This enables suitably low concentration solutions, ie not more than 0.25% w/v, of the thermoplastic resin to be used in a sizing operation. It has been found that, at concentrations above this figure or with more viscous solutions arising from a higher molecular weight resin, there is a tendency for the fibre tow to be coated in contrast to impregnation of the tow and wetting of the individual fibres in the tow to coat them with the thermoplastic resin. Additionally, the sized fibres need to be dried at above the boiling point of the solvent otherwise significant quantities of the solvent remain in the tow. The solution of thermoplastic resin used in the sizing operation may be of any suitable solvent; however, a strong solvent such as N-methyl pyrollidone (NMP) is preferred. Alternatively, a dichloromethane/methanol solvent system can be used. Thus, the amount of thermoplastic resin size on the fibres is not more than 6.0% by weight of the fibres and is preferably greater than 1% by weight of the fibres.

The thermoplastic resin is selected to have a Tg consistent with the CUT of the cured thermosettable resin matrix so that the CUT of the final composite material is not significantly detrimentally affected by the thermoplastic resin. Accordingly, thermoplastic resins are preferred which have a Tg of at least 80° C., more preferably at least 100° C. and particularly at least 150° C. In the preferred polyimide composite materials, it is especially preferred that the thermoplastic resin has a Tg of at least 200° C., more preferably at least 240° C.

It is preferable that the thermoplastic resin has reactive functionality to enable it to cross-link with the thermosettable resin matrix upon curing of the composite material. The thermoplastic resin preferably has end groups and/or pendant groups of formula —R—Z where R is a divalent hydrocarbon group, preferably aromatic, and Z is a group reactive with the thermosettable resin matrix or with a curing agent or with like groups on other polymer molecules. For example, when the thermosettable resin is epoxy, cyanate or cyanate ester, Z is hydroxy, amine, cyanate, cyanate ester, epoxy, vinyl or ethynyl; when the thermosettable resin is BMI, phenol-formaldehyde or polyimide, Z is nadimide, maleimide, amine, anhydride, vinyl or ethynyl.

Preferred thermoplastic resins are polysulphones, imidised polysulphones and polyisoimides.

The polysulphone preferably containing ether- and/or thioether-linked repeating units

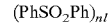

and, optionally,

where Ph is phenylene, especially 1,4-phenylene, a and nl are independently 1 to 2 and may on average be fractional (ie the average value for a given polymer chain containing units having various values of nl or a) and the phenylenes in $(Ph)_a$ (when a exceeds 1) are linked by a single chemical bond or a divalent group other than —$SO_2$—, for example —CO—. The value of n is preferably such that on average at least two units $(PhSO_2Ph)_{nl}$ are in immediate mutual succession in each polymer chain present. Preferably, nl is about 1.5.

The polysulphone may contain minor proportions, eg not more than 25 mole % of other repeating units.

Preferably, the polysulphone has end groups selected from nadimide, maleimide amine, anhydride, vinyl or ethynyl, especially amine.

The imidised polysulphone is preferably of formula:

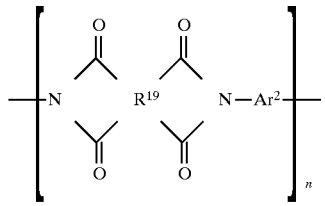

wherein $R^{19}$ is an aromatic group preferably selected from:
    wherein A is a direct link, —O—, —S—, —SO—, —$SO_2$—, —CO—, —$CH_2$—, —$C(CH_3)_2$— or —$C(CF_3)_2$—; and
$Ar^2$ is an aromatic sulphone-containing group preferably selected from:

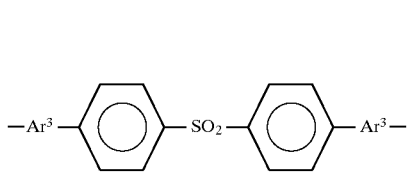

wherein $Ar^3$ is an aminophenol residue, for example:

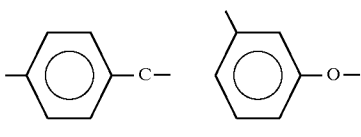

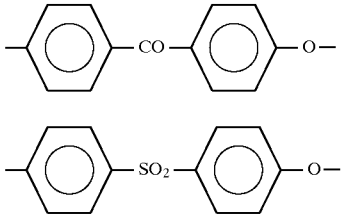

-continued

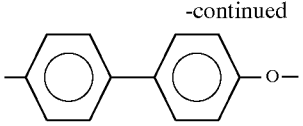

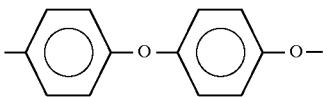

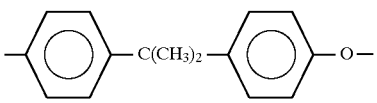

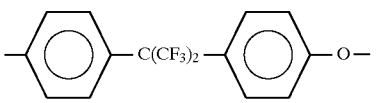

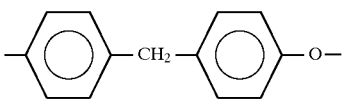

A preferred imidised polysulphone is:

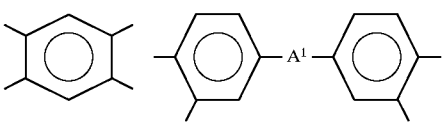

Preferably, the imidised polysulphone has end groups selected from nadimide, maleimide amine, anhydride, vinyl or ethynyl, especially amine.

The polyisoimide is preferably of formula:

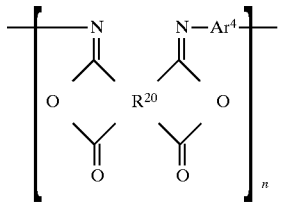

wherein $R^{20}$ is an aromatic group preferably selected from:

wherein $A^1$ is a direct link, —O—, —S—, —SO—, —$SO_2$—, —CO—, —$CH_2$—, —$C(CH_3)_2$— or —$C(CF_3)_2$—; and $Ar^4$ is an aromatic group, for example

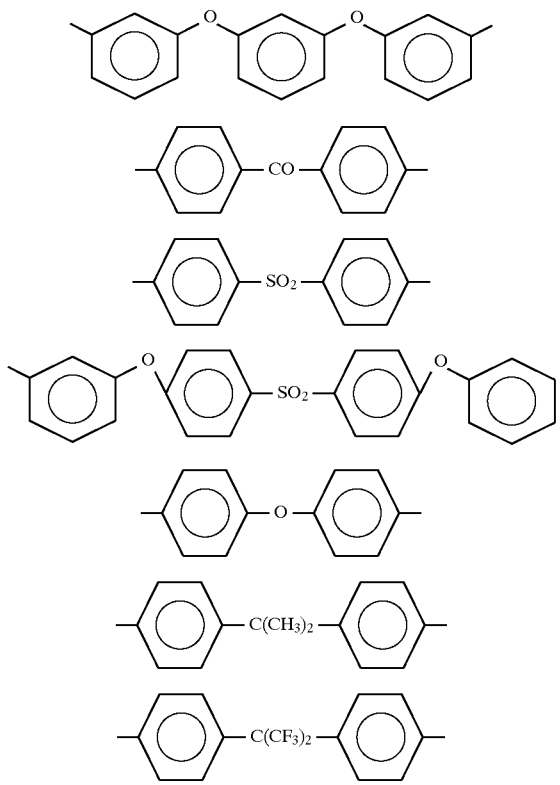

A preferred polyisoimide is:

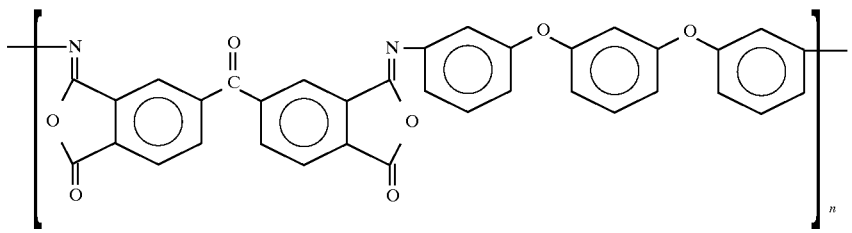

Preferably, the polyisoimide has end groups selected from nadimide, maleimide amine, anhydride, vinyl or ethynyl, especially ethynyl.

The invention also includes fibres sized with an amorphous, aromatic thermoplastic resin as herein described. Optionally, the fibres may be sized with a convention size such as an epoxy compatible size in addition to the thermoplastic resin.

The composite material according to the invention may also contain other fillers such as short or chopped fibres, typically of mean fibre length not more than 20 mm, for example about 6mm; toughening agents such as liquid rubbers having reactive groups; aggregates such as glass beads, rubber particles and rubber-coated glass beads; polytetrafluoroethylene, graphite, boron nitride, mica, talc and vermiculite, pigments, nucleating agents, and stabilisers such as phosphates. The total of such materials and the fibre reinforcement should be such that the composite material contains at least 20% by volume of reinforcing fibres and fillers of the polymer composition. The percentages of fibres and such other materials are calculated on the total composition after curing.

Composite materials according to the invention are also comprised by plies of the uncured composite material laminated together by heat and pressure, for example by compression moulding or by heated rollers, at a temperature above the curing temperature of the thermosettable resin matrix.

When the fibres of the reinforcement are unidirectional, the resulting multi-ply laminate may be anisotropic in which the fibres are oriented essentially parallel to one another or quasi-isotropic in each ply of which the fibres are oriented at an angle, conveniently 45° as in most quasi-isotropic laminates but possibly for example 30° or 60° or 90° or intermediately, to those in the plies above and below. Orientations intermediate between anisotropic and quasi-isotropic, and combination laminates, may be used. Suitable laminates contain at least four, preferably at least eight, plies. The number of plies is dependent on the application for the laminate, for example the strength required, and laminates containing thirty-two or even more, for example several hundred, plies may be desirable. There may be aggregates, as mentioned above in interlaminar regions.

When the fibres of the reinforcement are in the form of a woven fabric, structures may be quasi-isotropic or intermediate anisotropic and quasi-isotropic.

The invention also includes a process of sizing fibres with an amorphous, aromatic thermoplastic resin which comprises passing the fibres through a solution of said thermoplastic which has a number average molecular weight in the range 1500 to 30000, more particularly 3000 to 20000, especially 3000 to 15000 and the concentration of said resin in said solution being no greater than 0.25% w/v to wet the fibres with said solution and drying the wetted fibres at a temperature greater than the boiling point of the solvent forming the solution.

Additionally, the invention includes a process of making a composite material according to the invention which comprises passing the fibres through a solution of said thermoplastic which has a number average molecular weight in the range 1500 to 30000, more particularly 3000 to 20000, especially 3000 to 15000 and the concentration of said resin in said solution being no greater than 0.25% w/v to wet the fibres with said solution, drying the wetted fibres at a temperature greater than the boiling point of the solvent forming the solution and impregnating the resultant sized fibres with a thermosettable resin.

Optionally, the fibres may be sized with a conventional size in addition to the thermoplastic resin, for example an epoxy compatible size. In that instance, the conventionally sized fibres will be sized with the thermoplastic resin prior to impregnation with the thermosettable resin.

The invention will now be illustrated by reference to the following Examples and to the accompanying drawings, in which.

Figure 13:
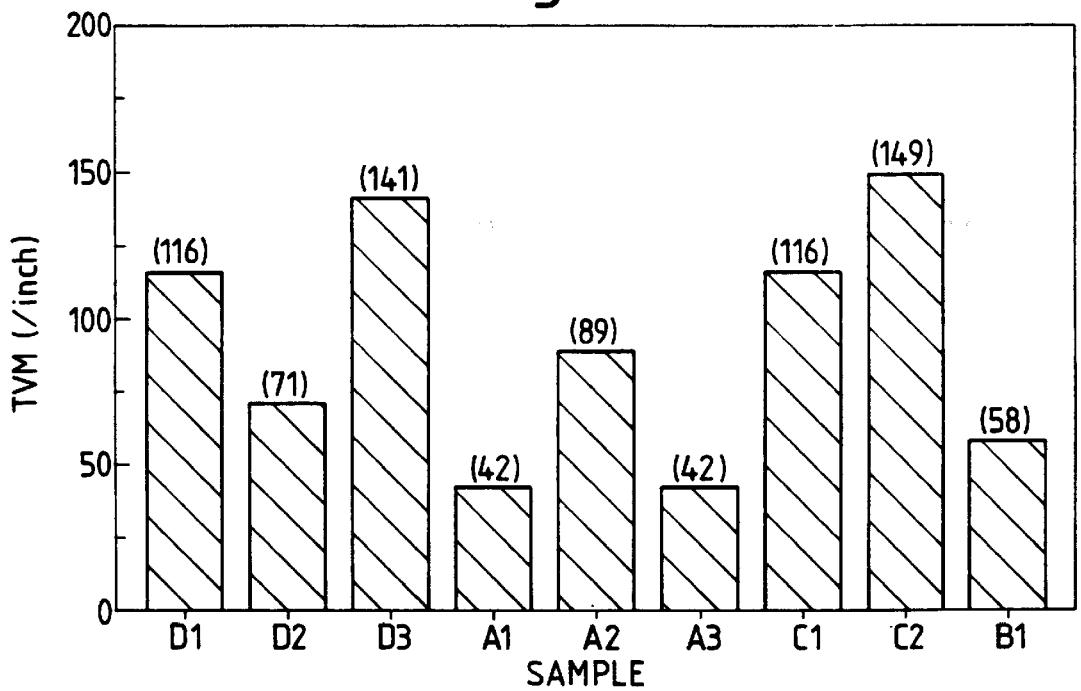
Figure 14:
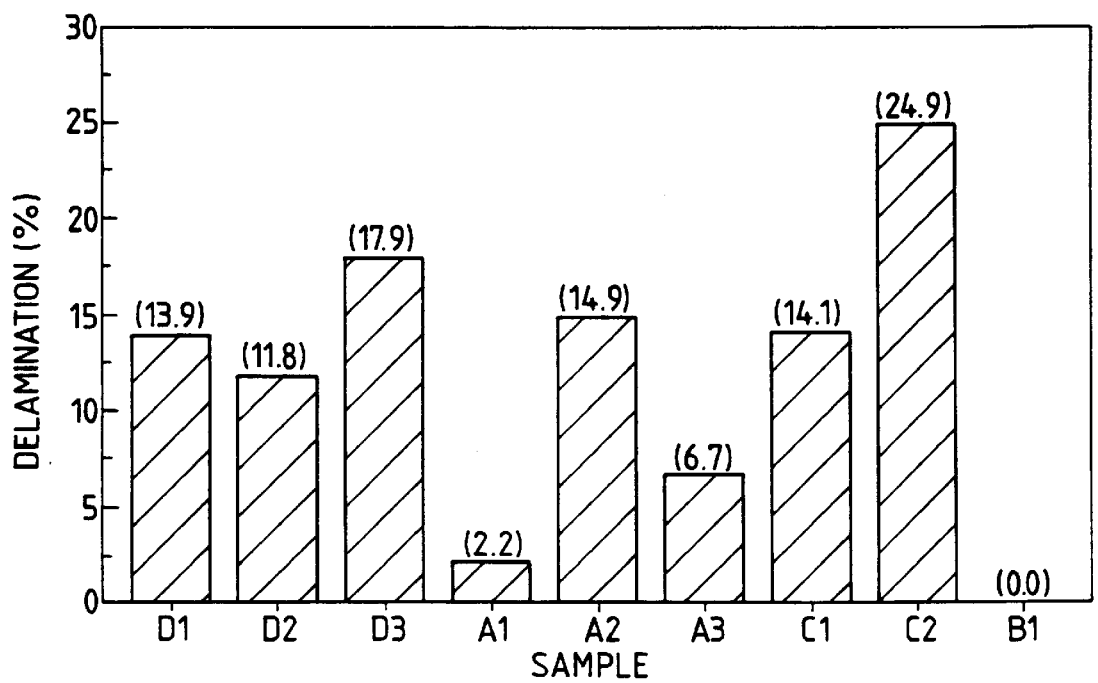
Figure 15:
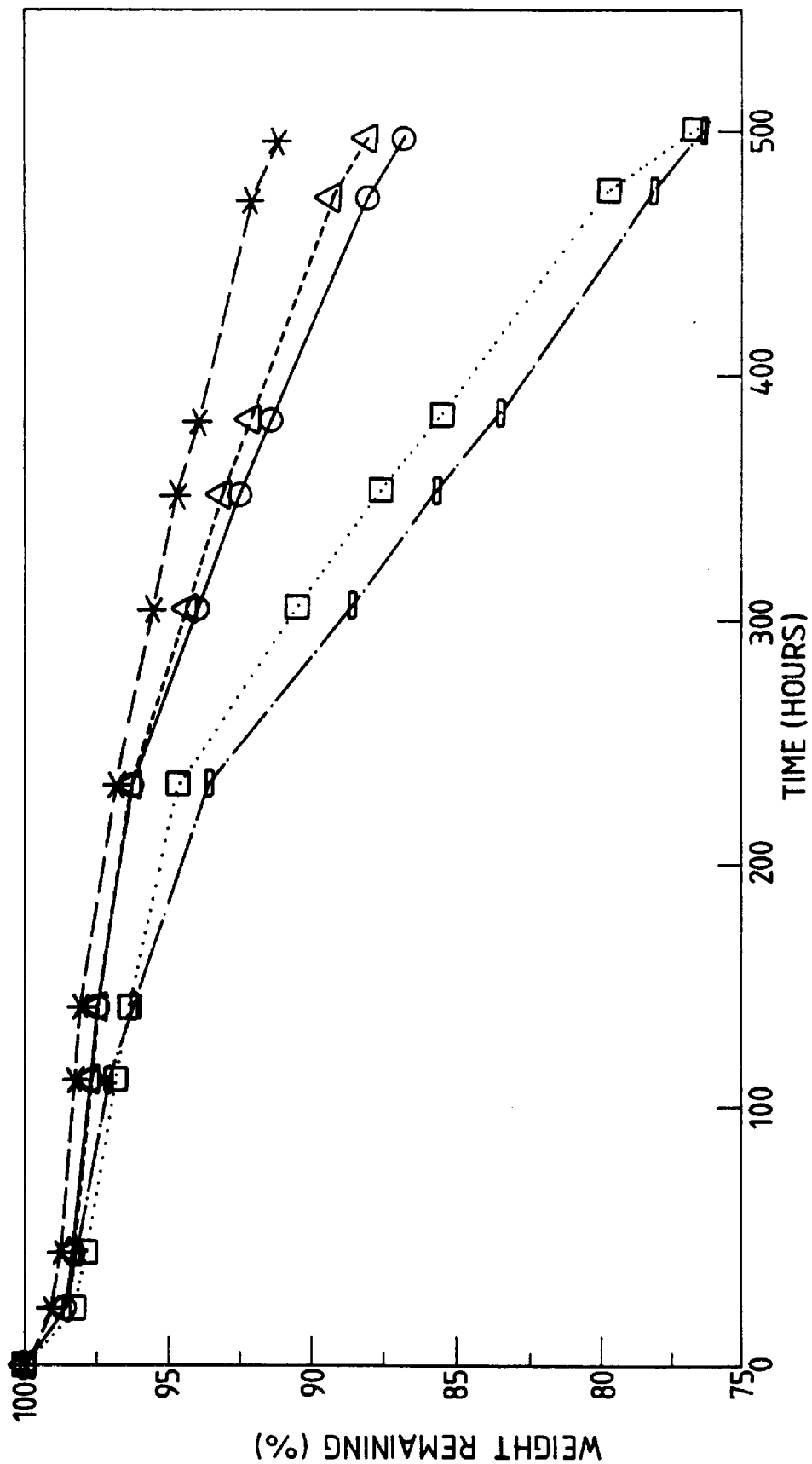
Figure 16:
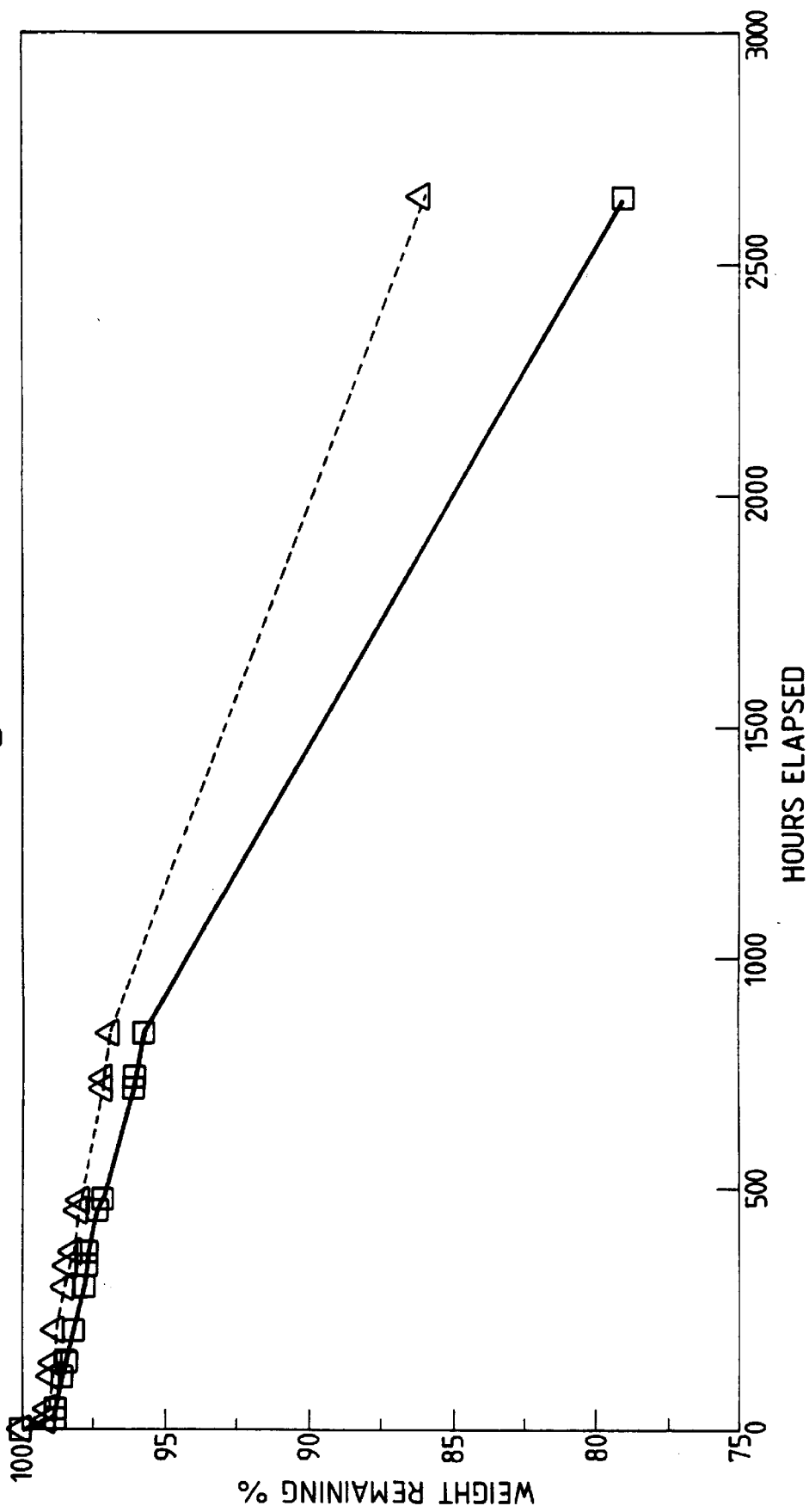
Figure 17:
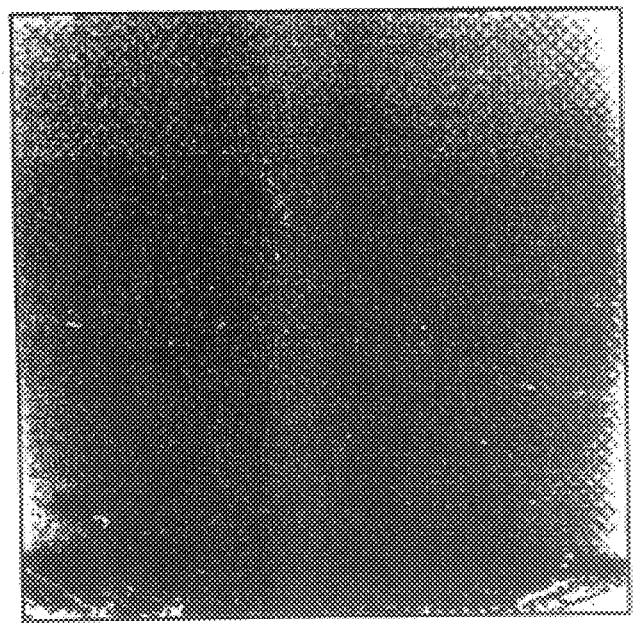
Figure 18:
Figure 19A:
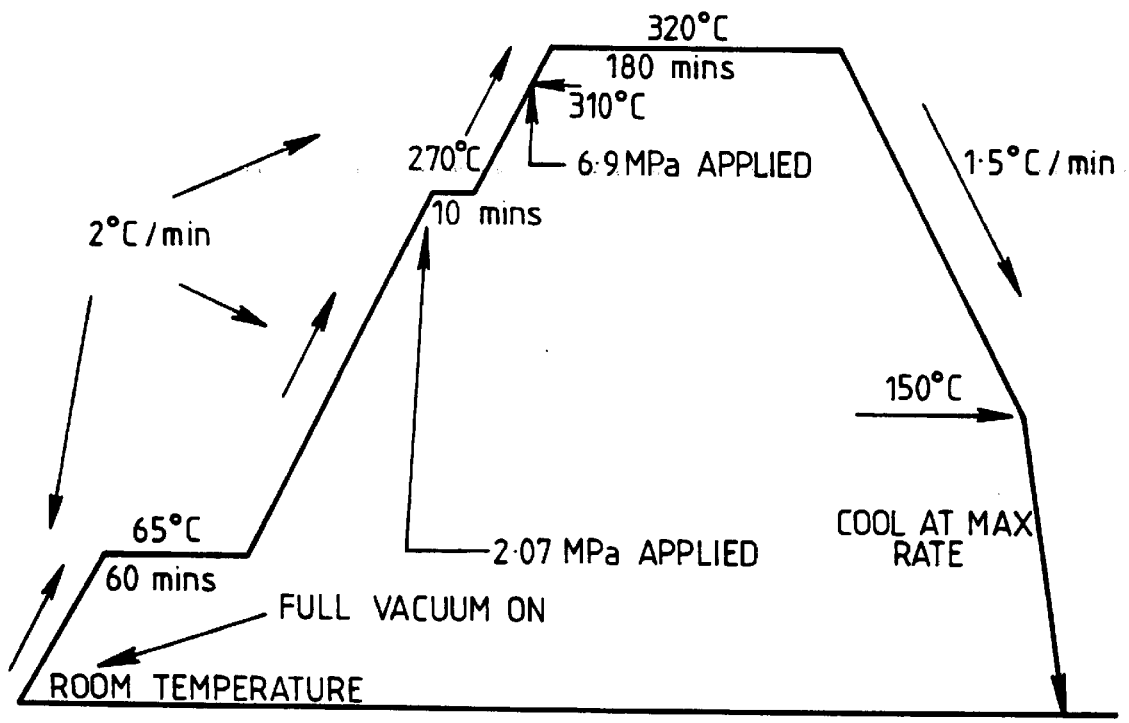
Figure 19B:
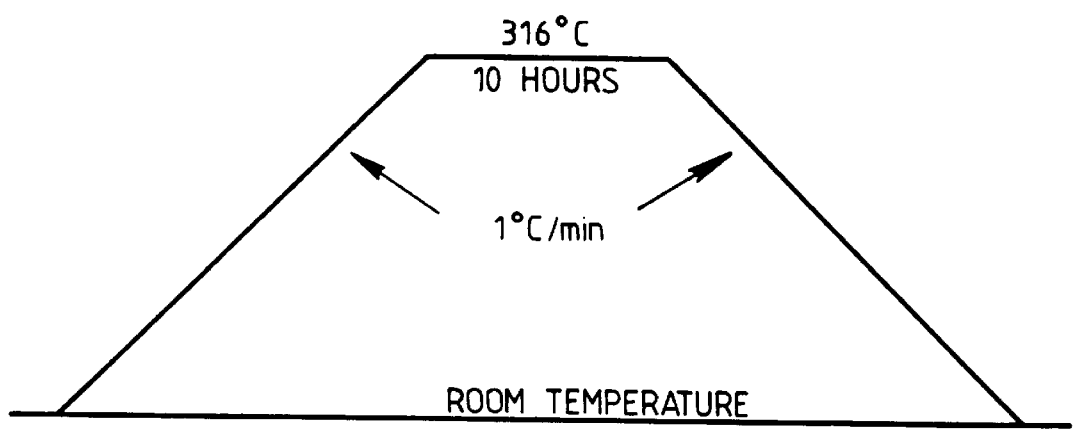
Figure 20:
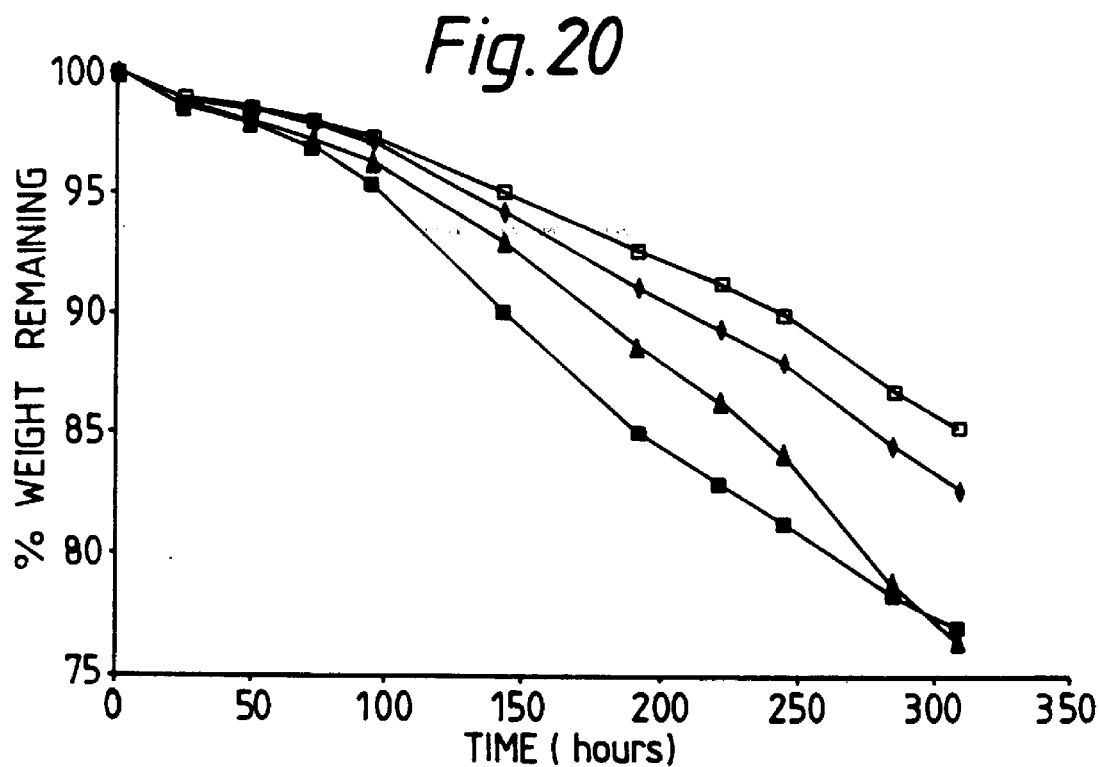
Figure 21:
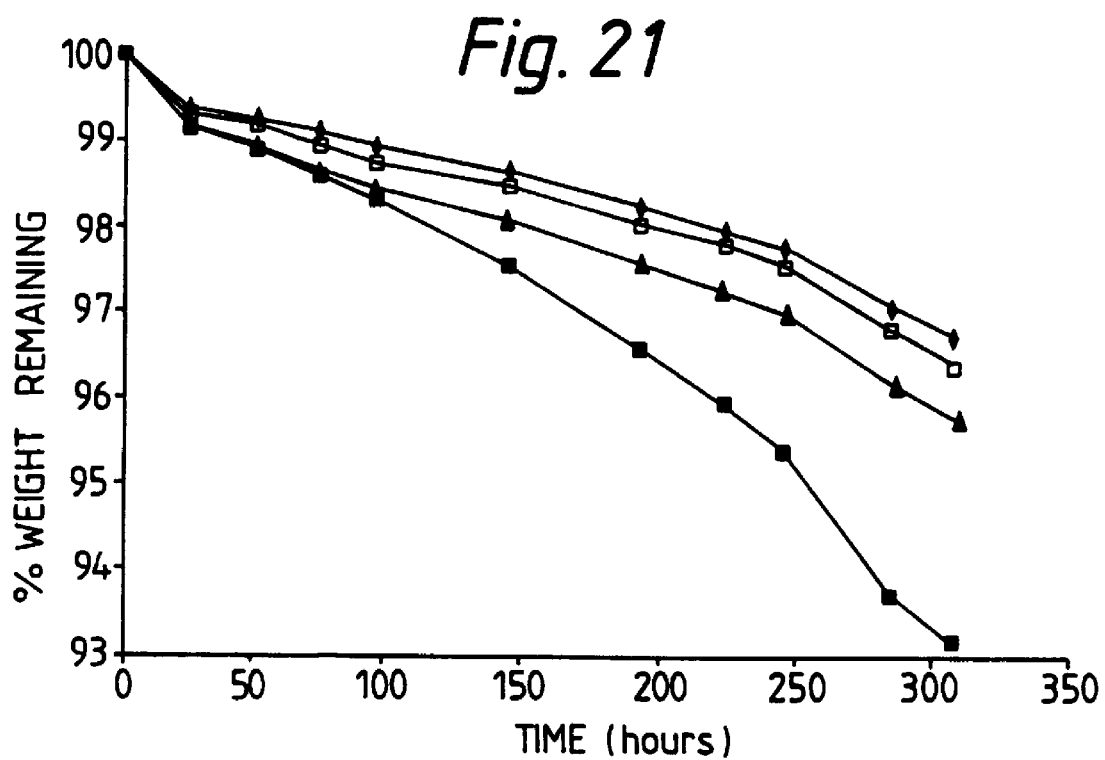
Figure 22:
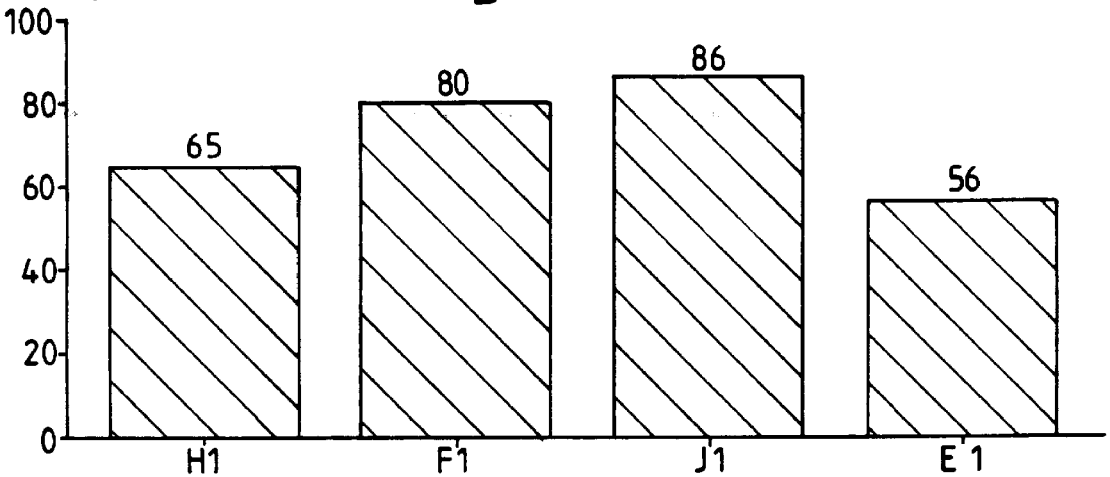
Figure 23:
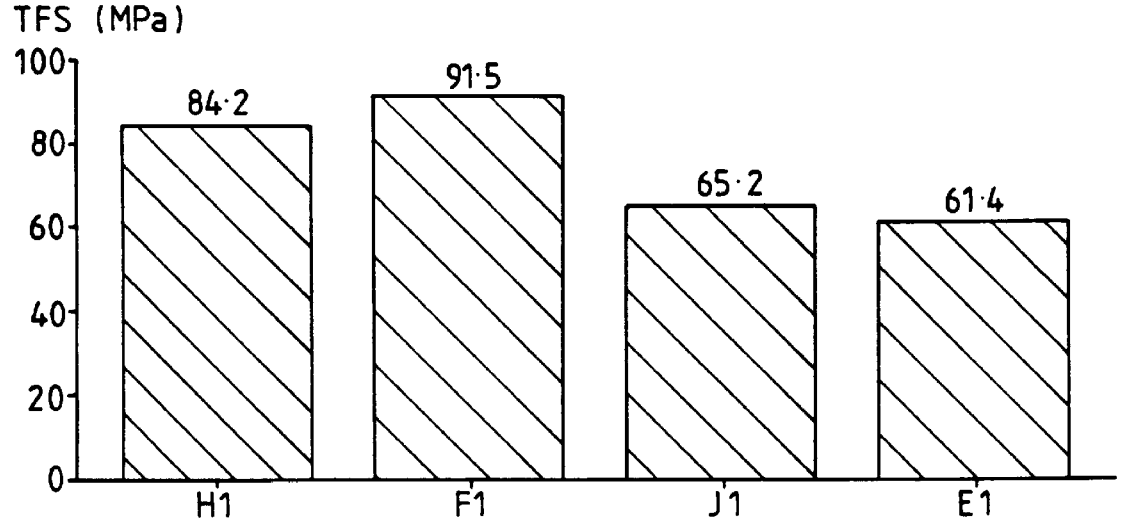
Figure 24:
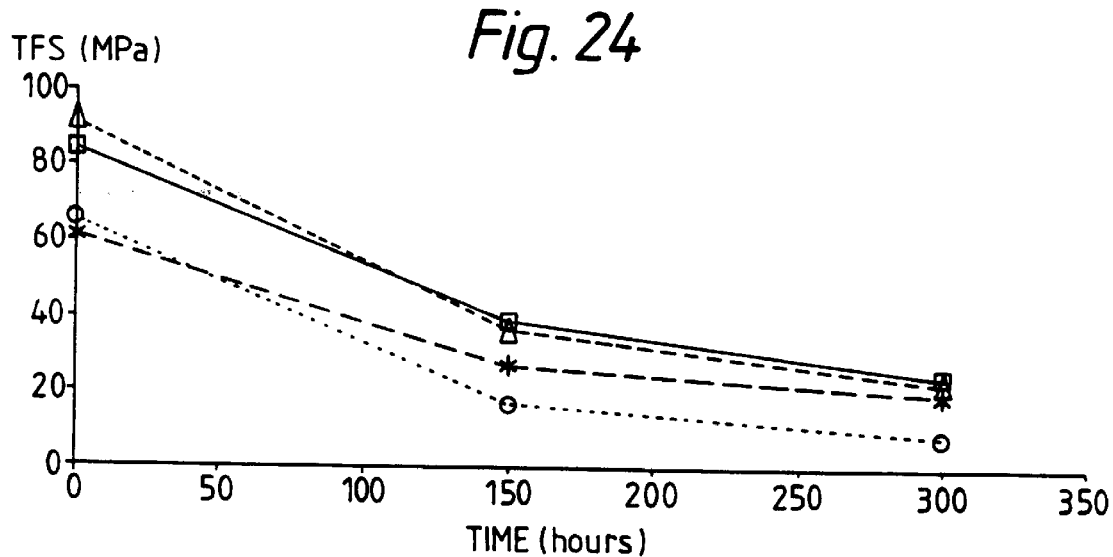
Figure 25:
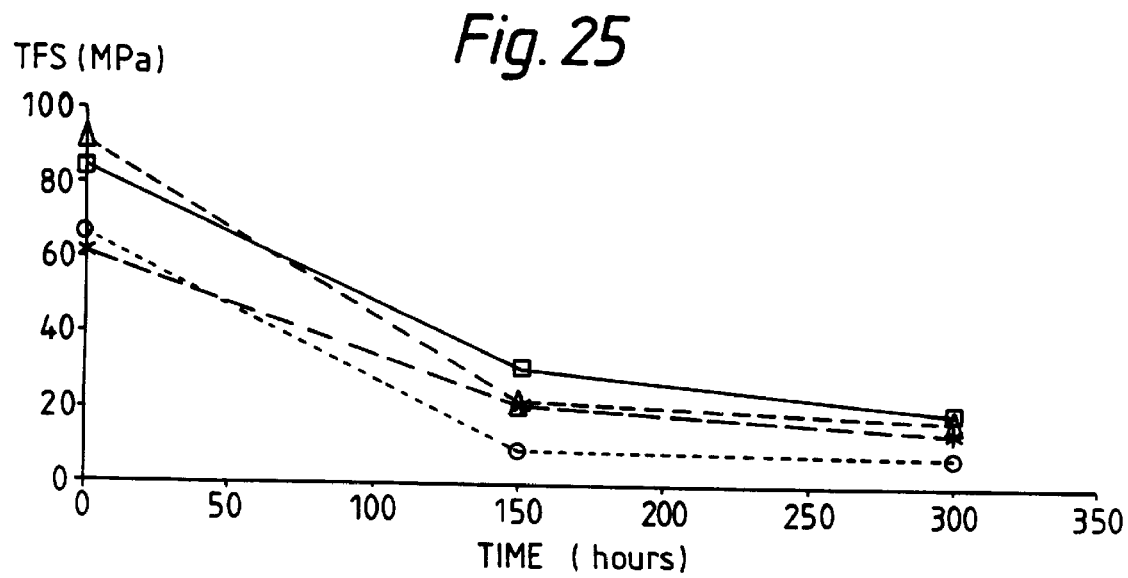

FIGS. 12(a), (b) and (c) are graphical representations of the imidization, cure and postcure cycles used for making laminates in accordance with Example 3;

FIGS. 13 and 14 are bar graph representations of the TVM density/inch and delamination % of the laminate samples of Example 3;

FIGS. 15 and 16 are graphical representations of TOS results of selected samples as identified in Example 3;

FIGS. 17 and 18 are micrographs of laminate samples as identified in Example 3;

FIGS. 19 (a) and (b) are graphical representations of the imidization, cure and postcure cycles used for making laminates in accordance with Example 5;

FIGS. 20 and 21 are graphical representations of TOS results of the samples as identified in Example 5;

FIG. 22 is a bar graph representation of the TVM density/inch of the laminated samples of Example 5;

FIG. 23 is a bar graph representation of the TFS (MPa) data of the as made laminated samples of Example 5; and FIGS. 24 and 25 are graphical respresentations of TFS (MPa) data of the laminated samples of Example 5 both as made and after ageing at 350° C. and 371° C., repectively.

Example 1

Three sizes were used as follows:

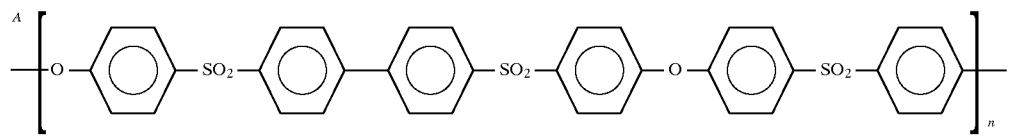

which has amine end groups, Tg=260° C. and Mn=12900;

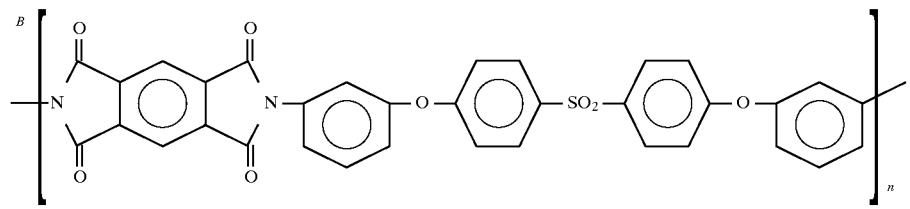

which has amine end groups, Tg=240° C. and Mn=11000;

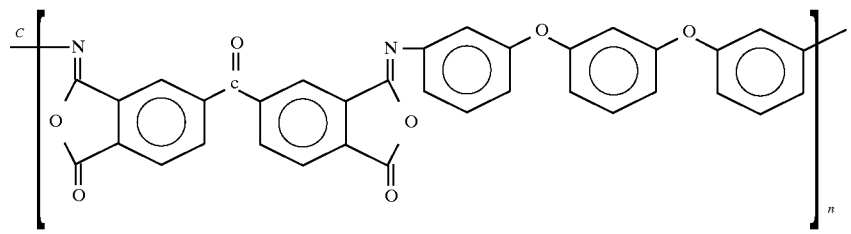

which has ethynyl end groups, Tg=160° C. and Mn=10000; to size a range of carbon fibres as shown in Table 1 for an initial TOS study.

Figure 1:
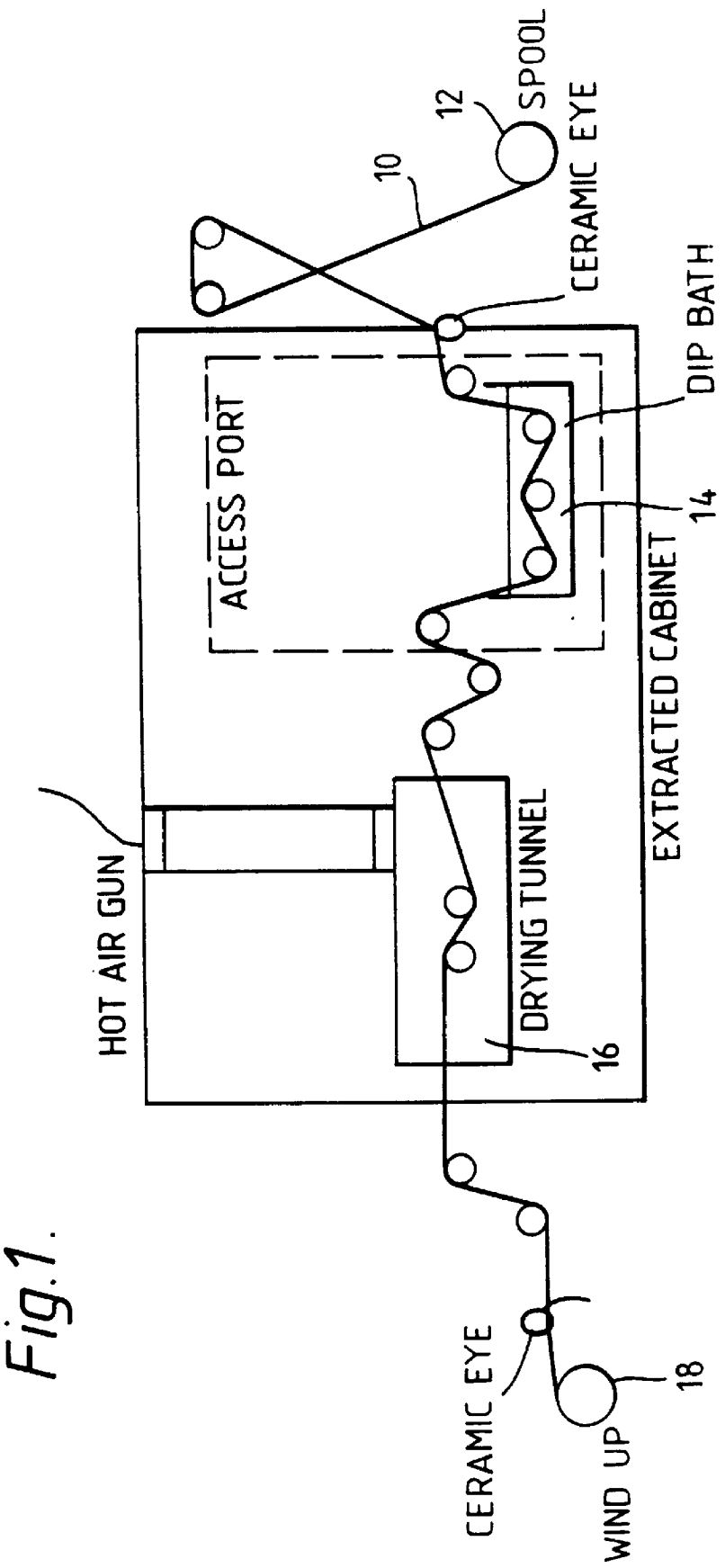
FIG. 1 is a schematic diagram of the apparatus used to size fibres with thermoplastic resin in accordance with the invention as described in Example 1 below.
Figure 2:
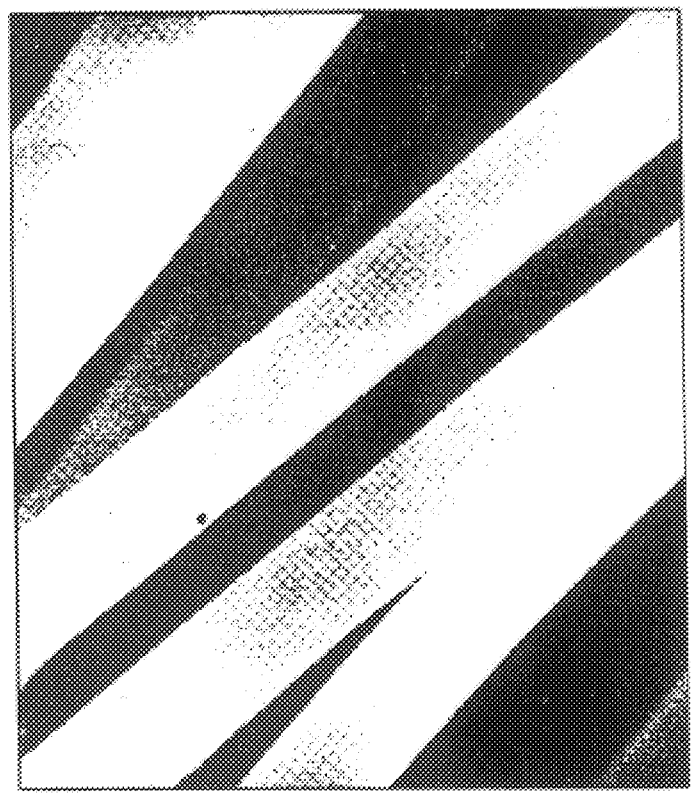
FIG. 2 is a micrograph of fibres identified as No 4 in Table 1 of Example 1 below sized with size C as described in Example 1.
Figure 3:
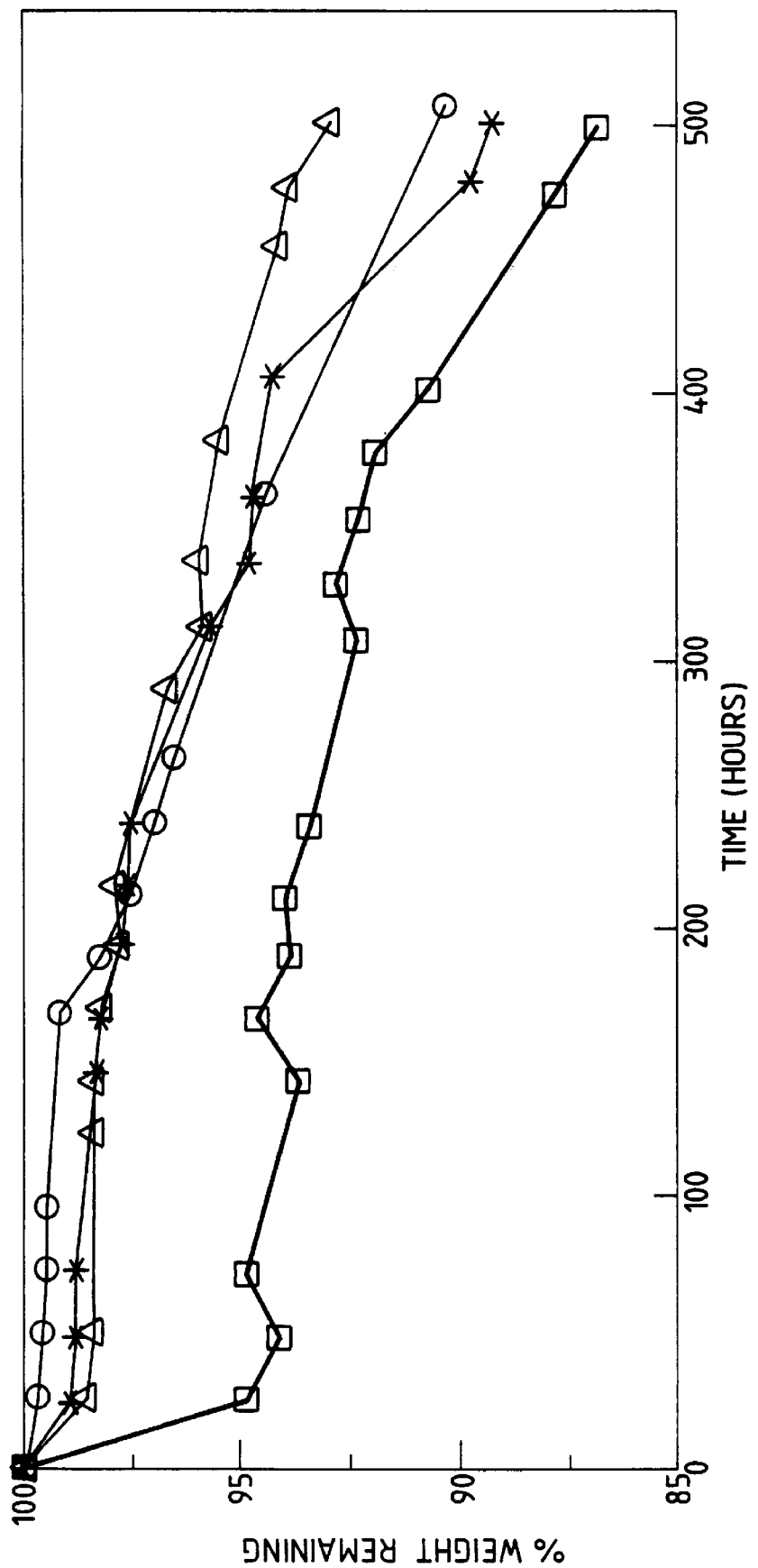
FIGS. 3,4,5,6,7,8,9,10 and 11 are graphical representations of the data of Tables 2 to 5 for each of the fibres listed 1 to 9 in Table 1, respectively.
Figure 4:
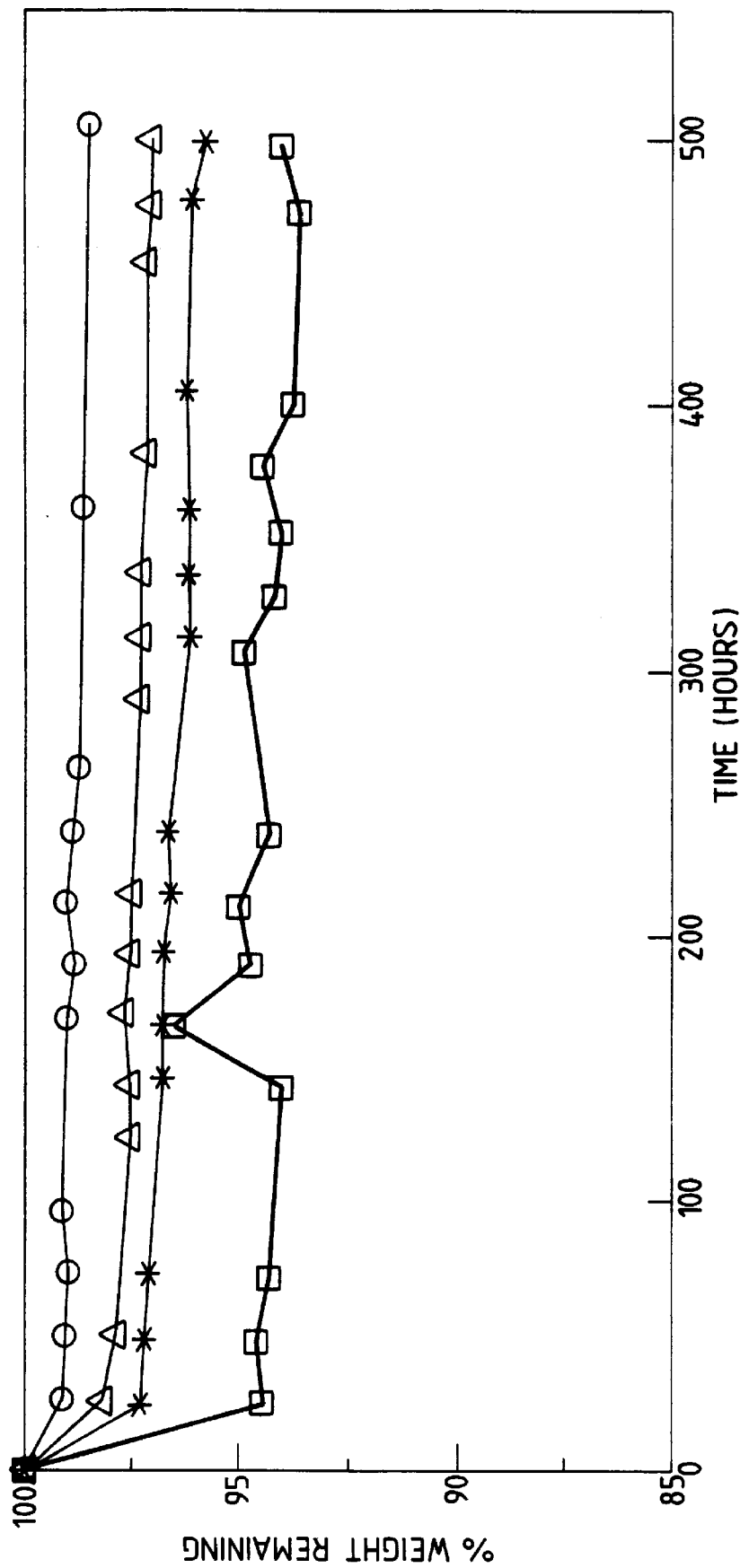
Figure 5:
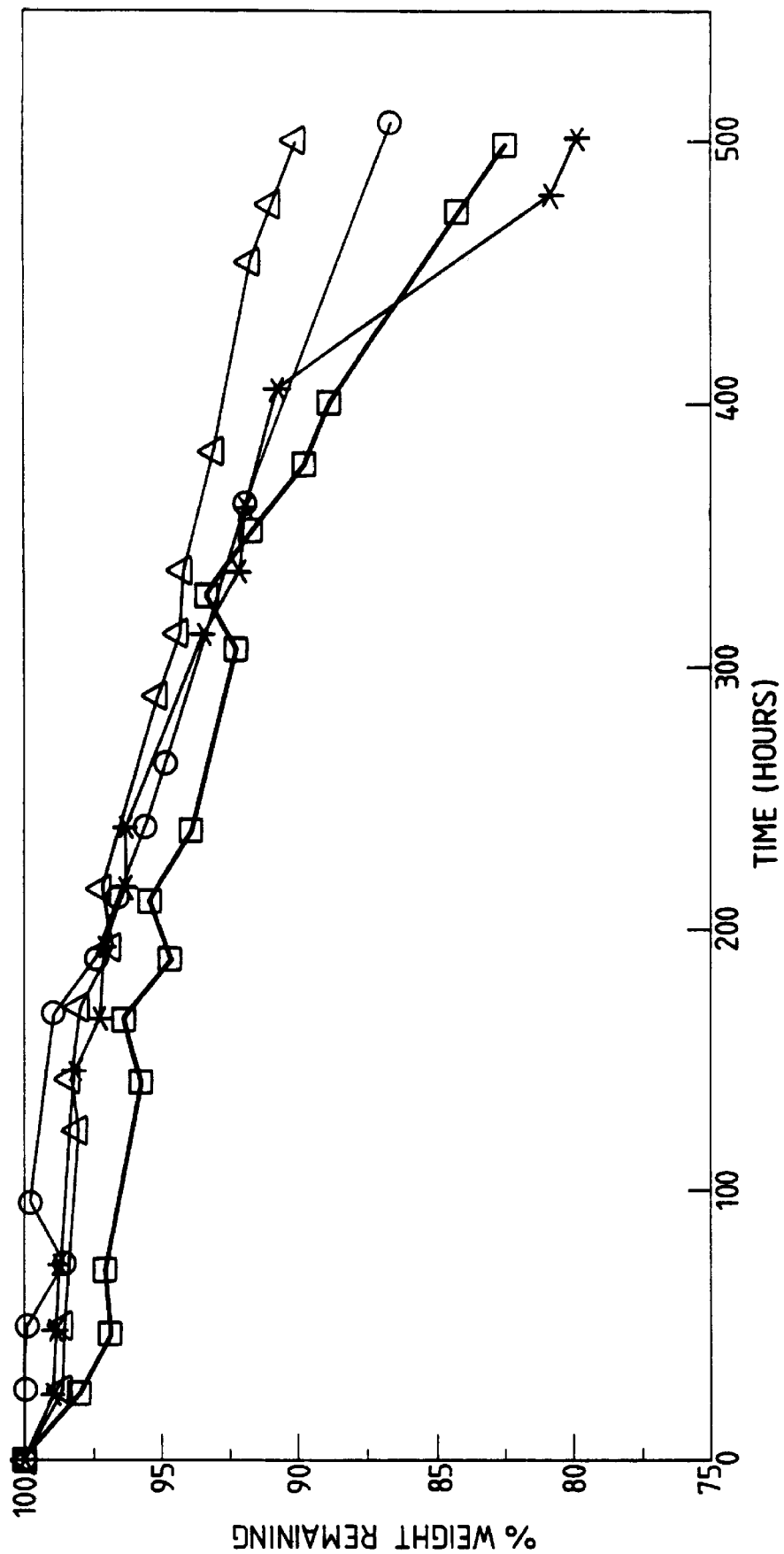
Figure 6:
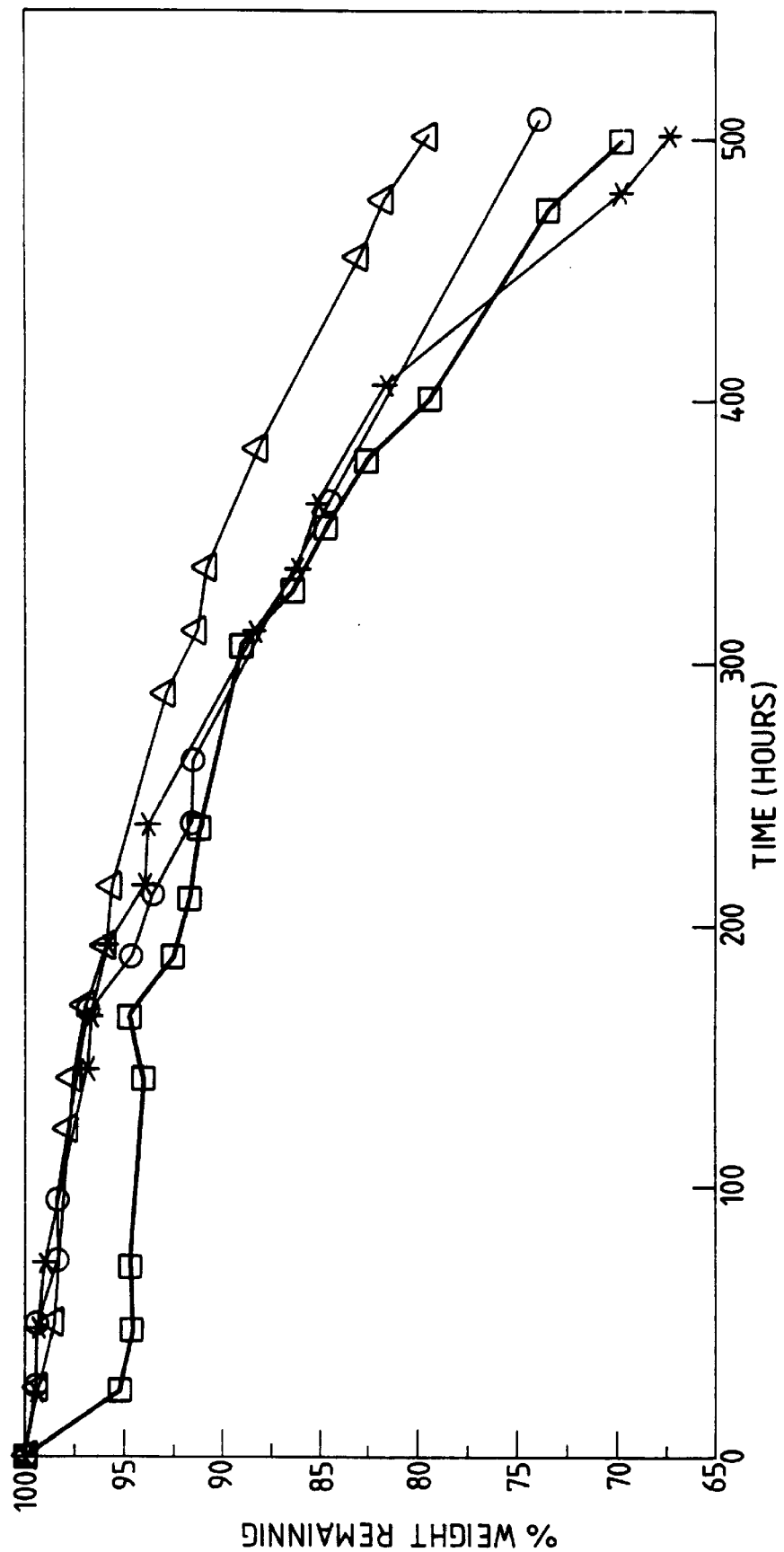
Figure 7:
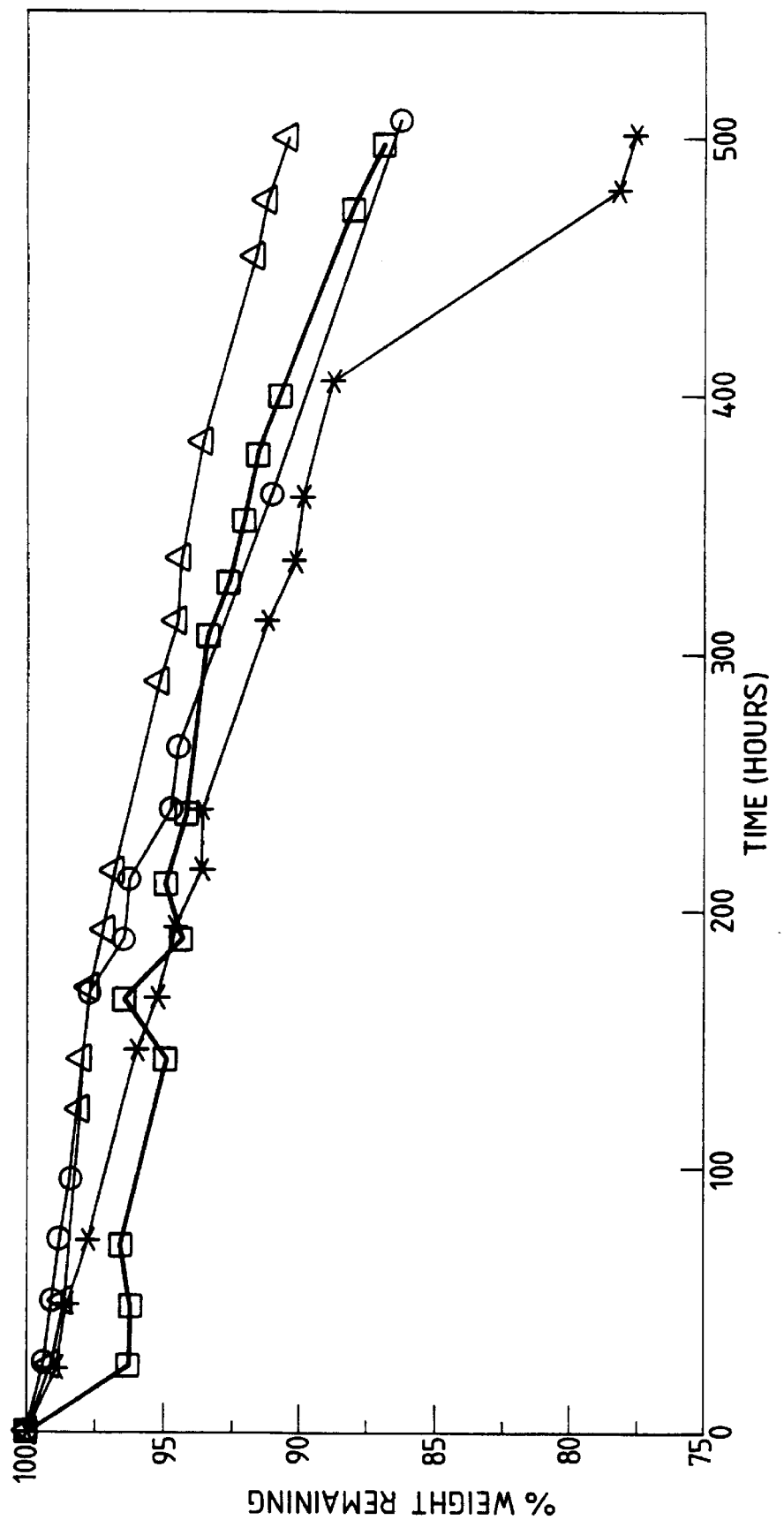
Figure 8:
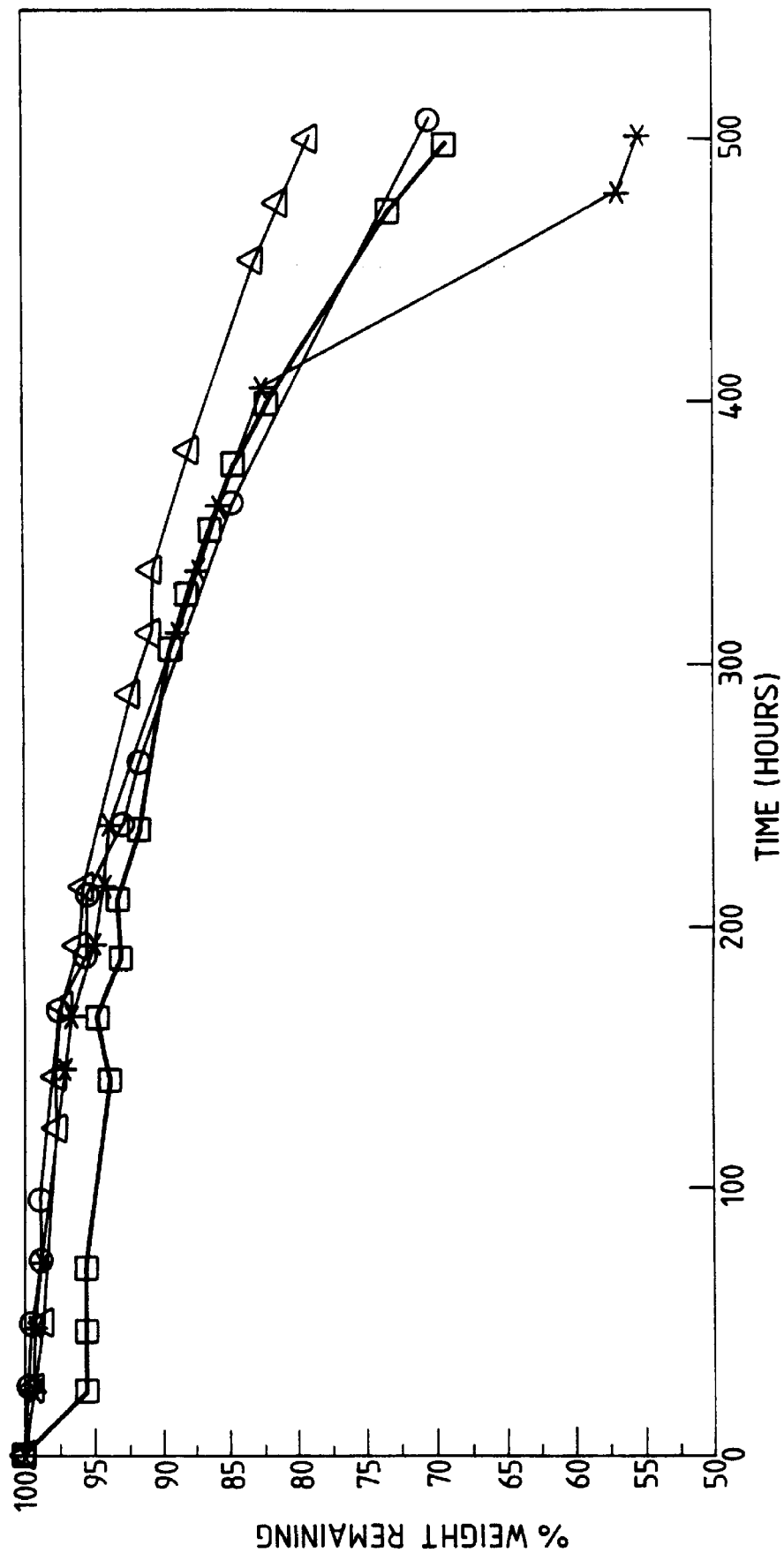
Figure 9:
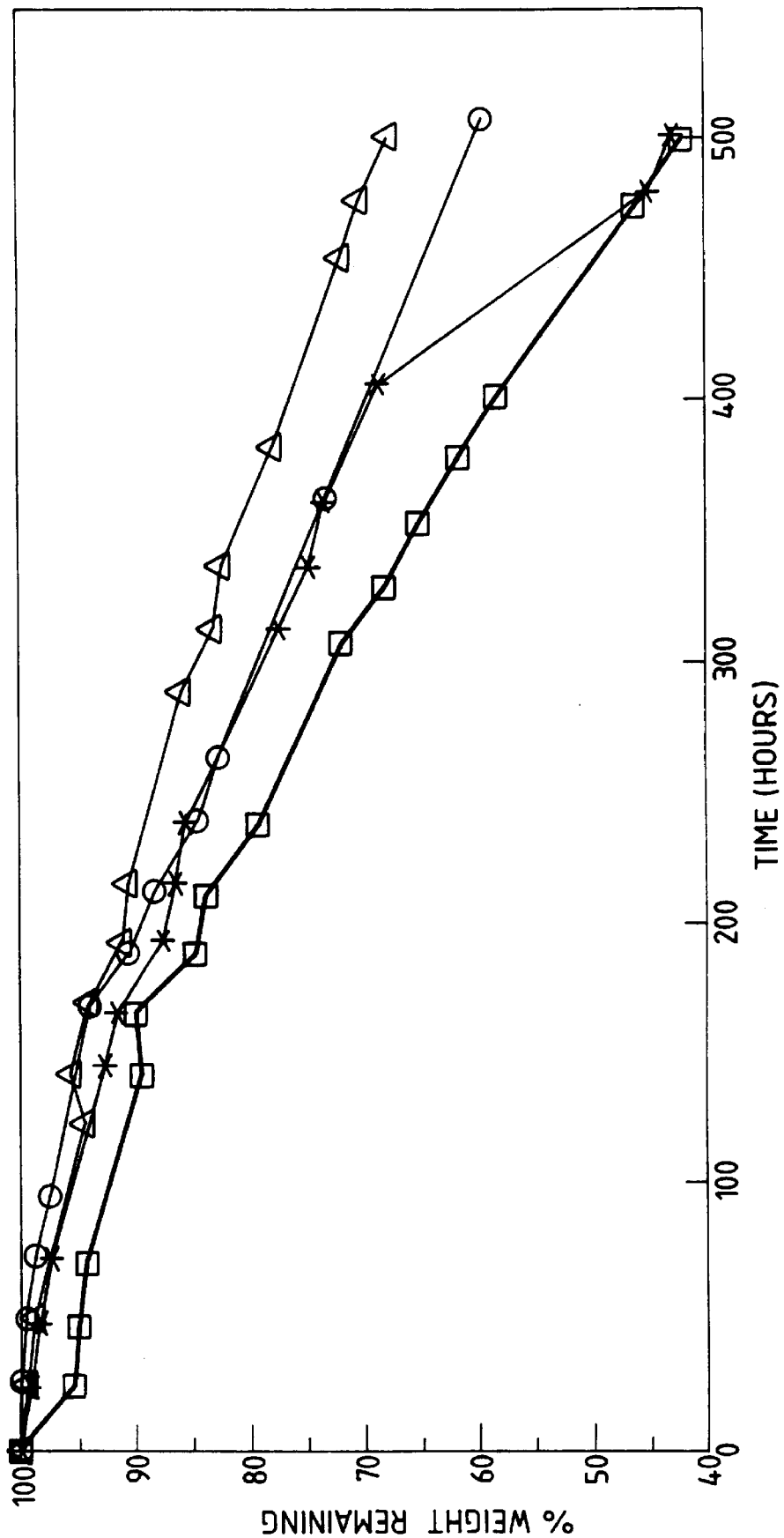
Figure 10:
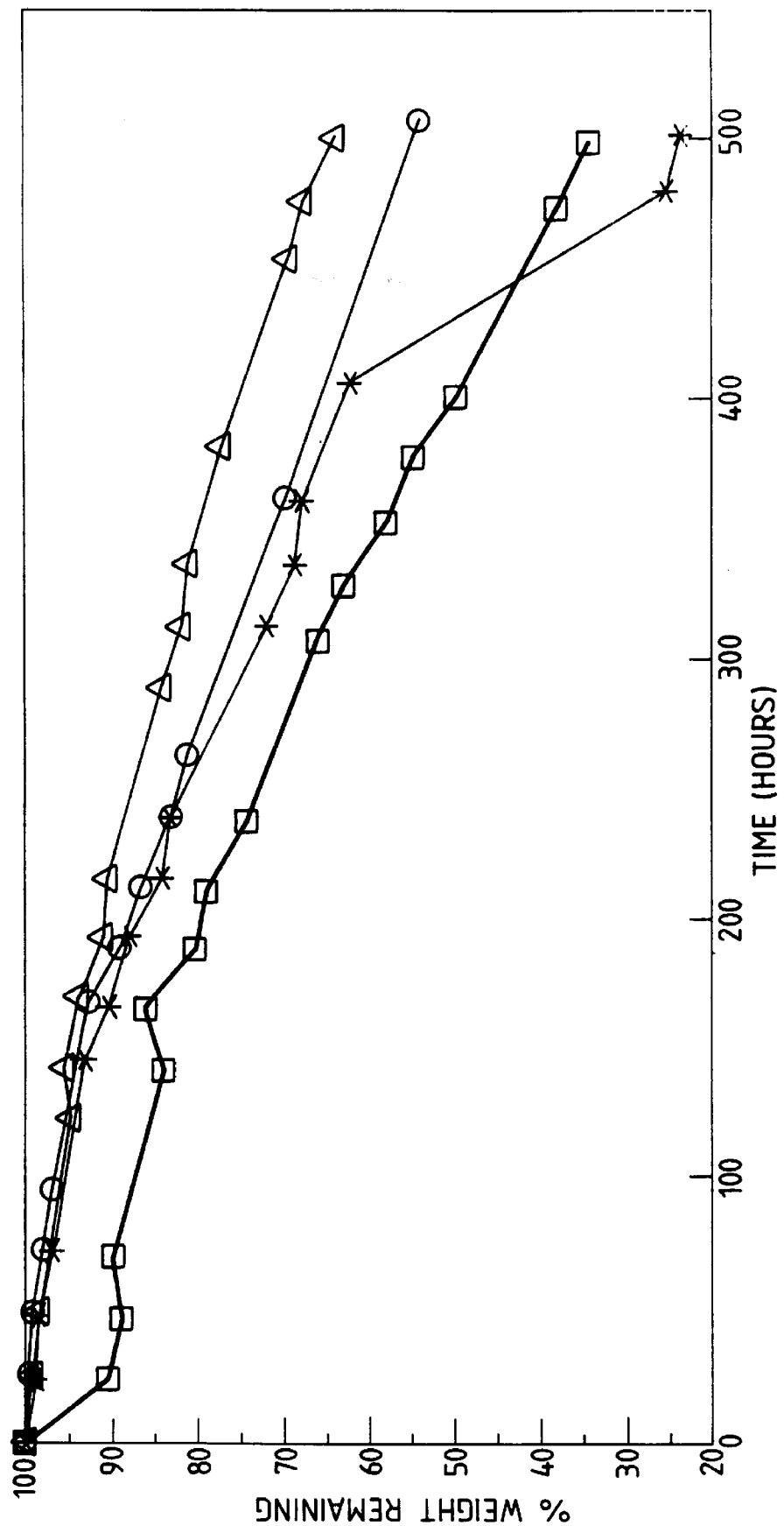
Figure 11:
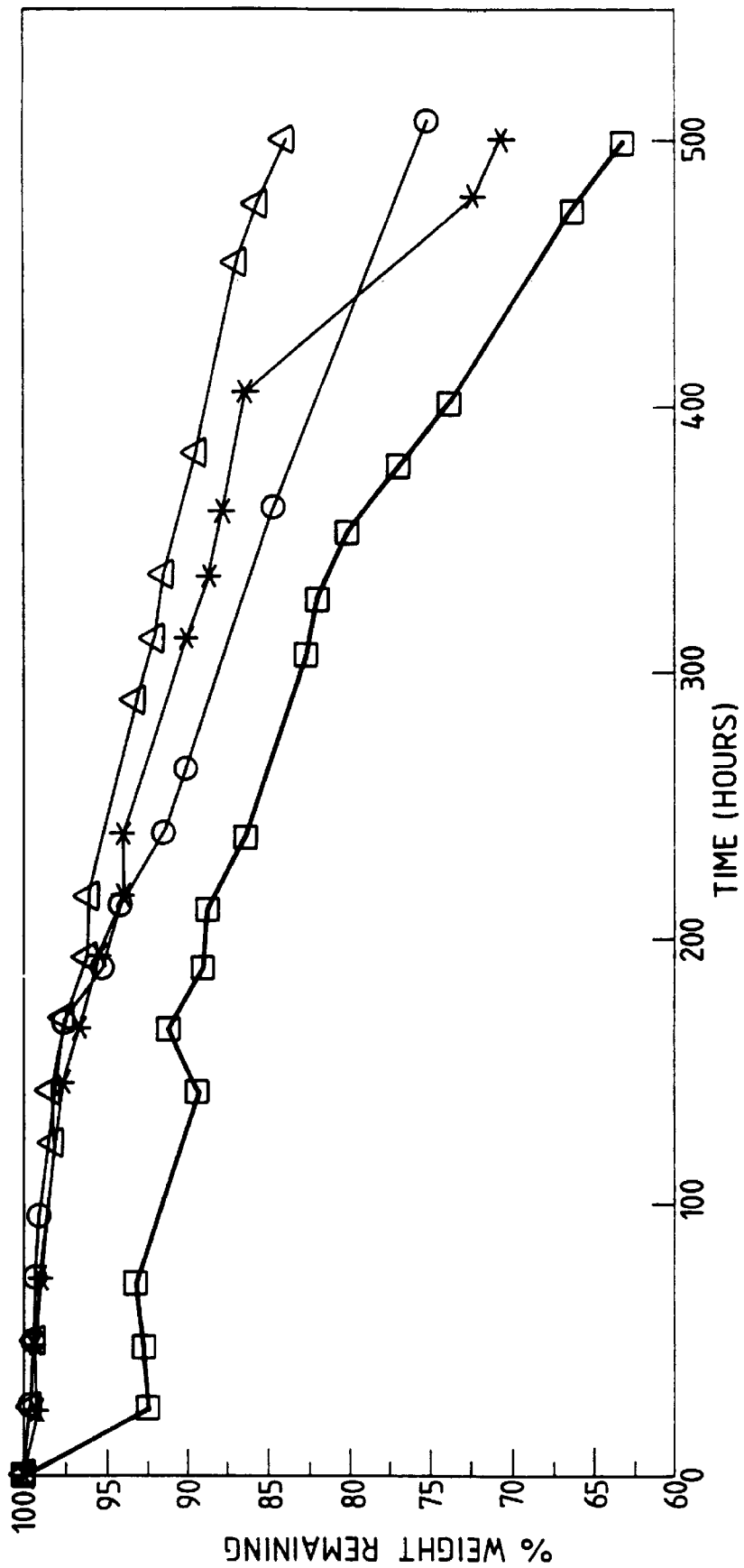

Using the apparatus shown in FIG. 1, a single tow (12K) 10 of each fibre type was pulled from a spool 12 and passed through a bath 14 containing an NMP solution of the sizing polymer at a line speed of approximately 1.61 m/min. The solution concentrations were, for A and C, 0.125% w/v and, for B, 0.0625% w/v. The tow was then passed through drying tunnel 16 to dry the fibres at 210° C. ±5° C. to remove the solvent and then wound onto a take off spool 18. Inspection of the tows suggested there was little if no residual solvent present. These conditions gave a good quality size on the individual fibres as shown in FIG. 2. As can be seen from the slightly wrinkled appearance of the coating on the fibre surface, a substantially uniform coating of the size is present on the individual fibres, with no evidence of deposition of thermoplastic resin around the tow or of tacking of individual fibres together. The visual appearance of the fibres was of a high sheen, indicative of good wetting of the fibres by the thermoplastic resin which appeared to be better than the commercial epoxy sizes applied to such fibres. Additionally, the handleability of the fibre tows was similar to epoxy-sized equivalents and, in subsequent impregnation of selected tows, fibre breakage was reduced compared to similar to epoxy-sized equivalents.

TABLE 1

| FIBRE | MANU-FACTURER | SIZE | SHAPE**/SURFACE+ | DIAMETER ($\mu$m) |
|---|---|---|---|---|
| 1. T650-42 | AMOCO | EPOXY (UC309) | BI/CR | 5.0 |
| 2. T40-R | AMOCO | EPOXY (UC304) | RO/CR | 6.75 |
| 3. T800-HB | TORAY | NONE | BI/CR | 5.0 |
| 4. IM7 | HERCULES | NONE | RO/SM | 5.0 |
| 5. IM8 | HERCULES | NONE | RO/SM | 5.0 |
| 6. AS4 | HERCULES | NONE | RO/SM | 5.0 |
| 7. HTA-7 | AKZO | NONE | RO/CR | 7.5 |
| 8. HTA-5001 | AKZO | NONE | RO/CR | 7.0 |
| 9. G30-500 | CELION | EPOXY (EP03) | RO/CR | 6.75 |

**BI = Bilobal  +CR = Crennelated
RO = Round    SM = Smooth

EXAMPLE 2

The TOS of the sized fibre tows of Example 1 was assessed by taking a 1m length of tow, coiling the 1m length on itself, locating the coiled length in an aluminium cup, covering it with perforated aluminium foil and periodically measuring weight loss during isothermal ageing of the 1m length at 350° C. in an air circulating oven. The isothermal ageing was taken over approximately 500 hours. The results are tabulated in Tables 2 to 5 below, Table 2 relating to the fibres without any thermoplastic resin size and Tables 3 to 5 relating to fibres with thermoplastic resin sizes A, B and C, respectively, in accordance with the invention.

The results are also represented graphically in FIGS. 3 to 11 by fibre type 1 to 9—see Table 1. The data from Table 2 is plotted using squares, Table 3 using triangles, Table 4 using circles and Table 5 using stars.

As can be seen from FIGS. 3 to 11, size A consistently gave an improvement in TOS over fibres not having the thermoplastic resin size; size B also consistently gave an improvement although not usually quite as good as size A; and size C gave some improvement on some fibres at the end of the test and did exhibit improvement during the earlier part of the test on all fibres.

The results also show that fibre type can have an affect on TOS performance. Using the 500 hour results from Tables 2 to 5, the fibre performances are ranked in Table 6.

EXAMPLE 3

Based on the unsized and sized fibre TOS performance and taking into account availability and cost, four fibre types were selected for impregnation with matrix resin and subsequent lamination. These were, from Table 1, fibres 1, 3, 5 and 9. Fibres 1 and 9 were also used without their epoxy size. The prepreg samples made are summarised in Table 7.

Samples A2 and D2 represent PMR-15/fibre combinations which have been extensively used PMR composite materials applications.

The selected fibre samples were impregnated with PMR-15 resin [BTDE:MDA:NE of 2.087:3.087:2 to correspond to a formulated molecular weight of 1500] (available as Fiberite 966D from ICI Composites Inc, Tempe, USA) using conventional techniques to form prepregs. Each prepreg was fabricated at 145 g/m$^2$ fibre areal weight and 40 wt % resin content.

The prepregs were then laid up as $[0,90]_{4s}$ and $[0]_{16}$ 150 mm×100 mm laminates for transverse microcracking and transverse flexural strength (TFS) testing, respectively.

Figure 12:
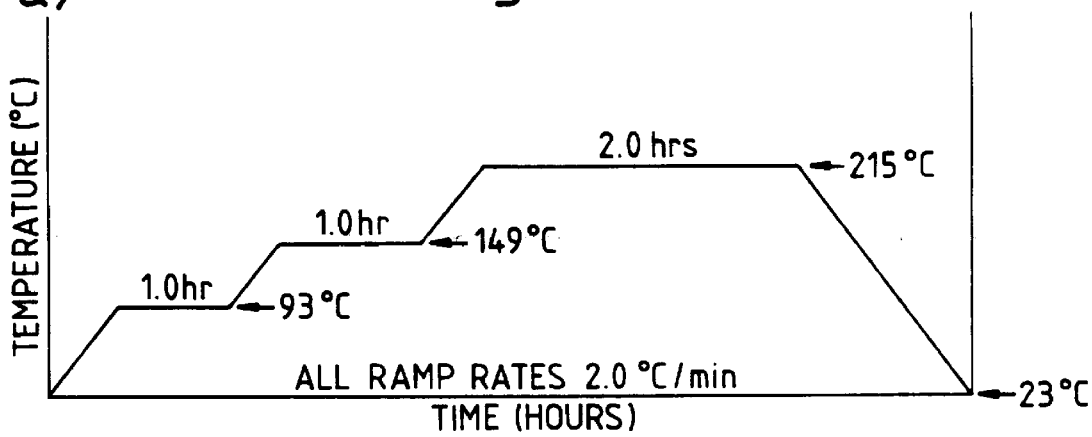
Figure 12:
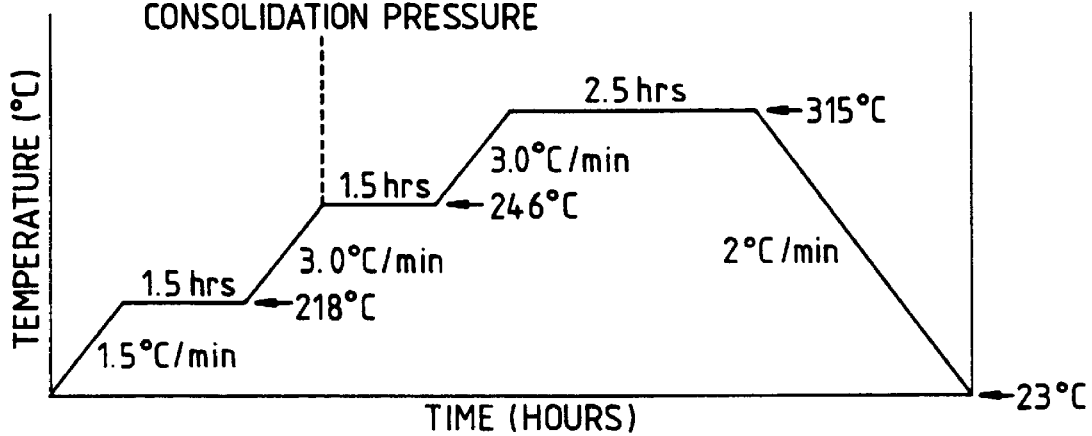
Figure 12:
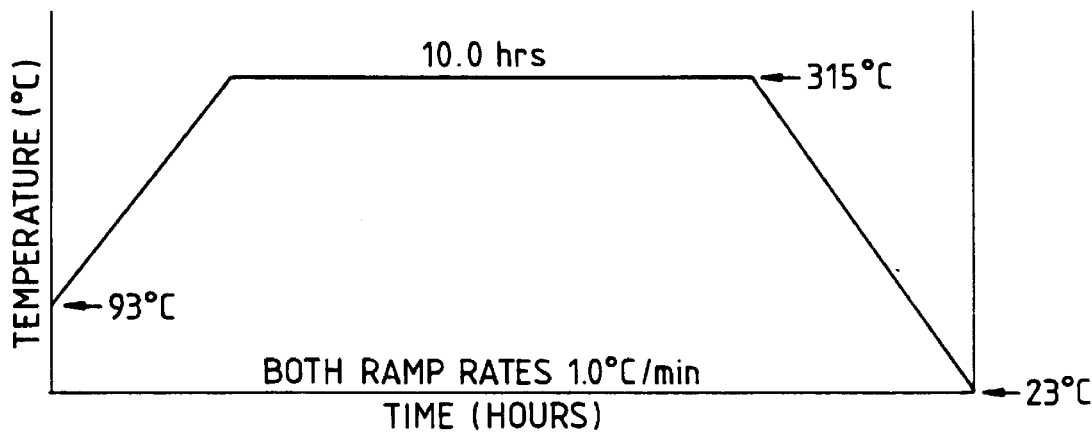

The imidization, cure and postcure cycles used were as shown in FIG. 12 (a), (b) and (c), respectively. The 6.895 MPa consolidation pressure used during the cure cycle was only necessary because the laminates were prepared using a compression mould. As the matrix is standard PMR-15, conventional autoclave cure of such samples at 1.397 MPa consolidation pressure would be viable.

All of the laminates were examined using ultrasonic C-scan and were found to be of very low void content. Samples A2, C1 and D3 were found to have a TVM density/inch of approximately 8, the remaining samples being microcrack free.

TABLE 2

TOS AT 350° C. ON FIBRES WITHOUT THERMOPLASTIC SIZE

% WEIGHT REMAINING

| HOURS | FIBRE 1 | FIBRE 2 | FIBRE 3 | FIBRE 4 | FIBRE 5 | FIBRE 6 | FIBRE 7 | FIBRE 8 | FIBRE 9 |
|---|---|---|---|---|---|---|---|---|---|
| 0 | 100.00 | 100.00 | 100.00 | 100.00 | 100.00 | 100.00 | 100.00 | 100.00 | 100.00 |
| 25 | 94.82 | 94.44 | 98.00 | 95.20 | 96.26 | 95.64 | 95.55 | 90.61 | 92.51 |
| 48 | 94.09 | 94.58 | 96.88 | 94.58 | 96.18 | 95.64 | 94.98 | 89.04 | 92.72 |
| 72 | 94.84 | 94.30 | 97.07 | 94.71 | 96.52 | 95.60 | 94.30 | 89.92 | 93.26 |
| 144 | 93.62 | 94.03 | 95.76 | 94.00 | 94.90 | 93.88 | 89.43 | 84.01 | 89.39 |
| 168 | 94.55 | 96.47 | 96.36 | 94.66 | 96.40 | 94.82 | 89.95 | 86.01 | 91.20 |
| 191 | 93.81 | 94.71 | 94.64 | 92.50 | 94.35 | 93.08 | 84.82 | 80.28 | 88.97 |
| 213 | 93.92 | 94.98 | 95.38 | 91.69 | 94.90 | 93.31 | 83.76 | 79.06 | 88.65 |
| 240 | 93.36 | 94.30 | 93.87 | 91.18 | 94.16 | 91.77 | 79.28 | 74.24 | 86.31 |
| 309 | 92.29 | 94.85 | 92.22 | 88.92 | 93.36 | 89.38 | 71.95 | 66.00 | 82.54 |
| 330 | 92.77 | 94.17 | 93.29 | 86.29 | 92.62 | 88.07 | 68.20 | 62.96 | 81.92 |
| 354 | 92.24 | 94.03 | 91.69 | 84.65 | 92.02 | 86.35 | 65.20 | 58.02 | 80.07 |
| 379 | 91.87 | 94.43 | 89.75 | 82.56 | 91.53 | 84.58 | 61.67 | 54.78 | 76.89 |
| 402 | 90.69 | 93.76 | 88.84 | 79.37 | 90.71 | 82.21 | 58.27 | 49.74 | 73.86 |
| 474 | 87.82 | 93.62 | 84.19 | 73.48 | 88.00 | 73.33 | 46.25 | 38.06 | 66.40 |
| 499 | 86.83 | 94.02 | 82.43 | 69.74 | 86.8 | 69.32 | 42.23 | 34.33 | 63.28 |

TABLE 3

TOS AT 350° C. ON FIBRES WITH THERMOPLASTIC SIZE A

% WEIGHT REMAINING

| HOURS | FIBRE 1 | FIBRE 2 | FIBRE 3 | FIBRE 4 | FIBRE 5 | FIBRE 6 | FIBRE 7 | FIBRE 8 | FIBRE 9 |
|---|---|---|---|---|---|---|---|---|---|
| 0 | 100.00 | 100.00 | 100.00 | 100.00 | 100.00 | 100.00 | 100.00 | 100.00 | 100.00 |
| 26 | 98.52 | 98.19 | 98.63 | 99.28 | 99.13 | 99.34 | 99.44 | 99.21 | 99.59 |
| 51 | 98.38 | 97.85 | 98.61 | 98.45 | 98.65 | 98.72 | 98.79 | 98.29 | 99.28 |
| 126 | 98.33 | 97.51 | 98.03 | 97.74 | 98.01 | 97.65 | 94.33 | 94.77 | 98.17 |
| 145 | 98.32 | 97.52 | 98.32 | 97.56 | 97.93 | 97.75 | 95.57 | 95.45 | 98.29 |
| 173 | 98.17 | 97.65 | 97.97 | 96.89 | 97.62 | 97.24 | 93.96 | 93.73 | 97.48 |
| 196 | 97.76 | 97.51 | 96.82 | 95.85 | 97.11 | 96.15 | 91.10 | 91.04 | 96.11 |
| 218 | 97.87 | 97.47 | 97.19 | 95.58 | 96.72 | 95.76 | 90.46 | 90.52 | 96.01 |
| 292 | 96.64 | 97.27 | 95.10 | 92.81 | 95.11 | 92.20 | 85.86 | 84.14 | 93.17 |
| 315 | 95.79 | 97.25 | 94.29 | 91.27 | 94.50 | 90.81 | 83.16 | 81.76 | 91.95 |
| 339 | 95.88 | 97.24 | 94.13 | 90.75 | 94.34 | 90.57 | 82.32 | 81.03 | 91.38 |
| 384 | 95.41 | 97.10 | 92.98 | 88.08 | 93.52 | 87.71 | 77.72 | 77.16 | 89.32 |
| 456 | 94.04 | 97.12 | 91.66 | 82.91 | 91.60 | 83.02 | 71.84 | 69.35 | 86.84 |
| 478 | 93.80 | 96.99 | 90.92 | 81.71 | 91.17 | 81.13 | 70.31 | 67.58 | 85.56 |
| 502 | 92.86 | 96.97 | 90.04 | 79.45 | 90.38 | 79.06 | 67.70 | 63.82 | 83.85 |

TABLE 4

TOS AT 350° C. ON FIBRES WITH THERMOPLASTIC SIZE B

% WEIGHT REMAINING

| HOURS | FIBRE 1 | FIBRE 2 | FIBRE 3 | FIBRE 4 | FIBRE 5 | FIBRE 6 | FIBRE 7 | FIBRE 8 | FIBRE 9 |
|---|---|---|---|---|---|---|---|---|---|
| 0 | 100.00 | 100.00 | 100.00 | 100.00 | 100.00 | 100.00 | 100.00 | 100.00 | 100.00 |
| 27 | 99.65 | 99.12 | 99.94 | 99.42 | 99.38 | 99.73 | 100.00 | 99.72 | 99.96 |
| 51 | 99.55 | 99.06 | 99.87 | 99.35 | 99.10 | 99.57 | 99.60 | 99.20 | 99.52 |
| 75 | 99.45 | 98.98 | 98.53 | 98.30 | 98.83 | 98.85 | 98.81 | 98.02 | 99.33 |
| 98 | 99.44 | 99.12 | 99.75 | 98.32 | 98.40 | 98.91 | 97.50 | 96.91 | 99.10 |
| 171 | 99.12 | 99.00 | 98.90 | 96.77 | 97.66 | 97.57 | 93.86 | 92.78 | 97.50 |
| 192 | 98.22 | 98.82 | 97.37 | 94.62 | 96.41 | 95.67 | 90.52 | 89.13 | 95.22 |
| 215 | 97.51 | 99.01 | 96.59 | 93.49 | 96.23 | 95.46 | 88.24 | 86.63 | 94.10 |
| 242 | 96.93 | 98.87 | 95.55 | 91.53 | 94.70 | 92.83 | 84.53 | 83.01 | 91.43 |
| 266 | 96.48 | 98.70 | 94.80 | 91.52 | 94.46 | 91.72 | 82.69 | 81.11 | 90.02 |
| 364 | 94.32 | 98.60 | 91.88 | 84.42 | 91.01 | 84.59 | 73.28 | 69.74 | 84.61 |
| 508 | 90.29 | 98.47 | 86.62 | 73.87 | 86.24 | 70.47 | 59.61 | 53.99 | 75.20 |

TABLE 5

TOS AT 350° C. ON FIBRES WITH THERMOPLASTIC SIZE C

% WEIGHT REMAINING

| HOURS | FIBRE 1 | FIBRE 2 | FIBRE 3 | FIBRE 4 | FIBRE 5 | FIBRE 6 | FIBRE 7 | FIBRE 8 | FIBRE 9 |
|---|---|---|---|---|---|---|---|---|---|
| 0 | 100.00 | 100.00 | 100.00 | 100.00 | 100.00 | 100.00 | 100.00 | 100.00 | 100.00 |
| 25 | 98.91 | 97.29 | 98.94 | 99.43 | 98.91 | 99.38 | 99.25 | 98.85 | 99.24 |
| 49 | 98.80 | 97.19 | 98.88 | 99.31 | 98.50 | 99.28 | 98.36 | 98.57 | 99.44 |
| 74 | 98.78 | 97.09 | 98.75 | 98.96 | 97.73 | 98.81 | 97.33 | 97.03 | 99.00 |
| 148 | 98.30 | 96.75 | 98.17 | 96.80 | 95.94 | 97.18 | 92.66 | 93.25 | 97.61 |
| 169 | 98.20 | 96.75 | 97.26 | 96.58 | 95.21 | 96.67 | 91.56 | 90.41 | 96.58 |
| 196 | 97.69 | 96.72 | 97.08 | 95.77 | 94.61 | 95.01 | 87.46 | 87.98 | 95.42 |
| 219 | 97.57 | 96.55 | 96.30 | 93.93 | 93.60 | 94.25 | 86.38 | 84.09 | 93.99 |
| 242 | 97.50 | 96.61 | 96.29 | 93.75 | 93.57 | 93.91 | 85.49 | 93.18 | 93.93 |
| 315 | 95.61 | 96.09 | 93.38 | 88.28 | 91.15 | 88.82 | 77.33 | 71.94 | 89.91 |
| 339 | 94.71 | 96.12 | 92.10 | 86.09 | 90.16 | 87.20 | 74.74 | 68.72 | 88.53 |
| 363 | 94.63 | 96.11 | 91.86 | 85.04 | 89.83 | 85.69 | 73.47 | 67.77 | 87.74 |
| 408 | 94.17 | 96.17 | 90.17 | 81.56 | 88.75 | 82.58 | 68.73 | 62.22 | 86.31 |
| 480 | 89.72 | 96.04 | 80.80 | 69.77 | 78.19 | 56.86 | 45.17 | 25.42 | 72.47 |
| 501 | 89.25 | 95.74 | 79.85 | 67.29 | 77.59 | 55.36 | 43.10 | 23.65 | 70.74 |

TABLE 6

| FIBRE POSITION | FIBRE TYPE | SIZE*** | % WEIGHT REMAINING |
|---|---|---|---|
| 1 | 2 | B | 98.47 |
| 2 | 2 | A | 96.97 |
| 3 | 2 | C | 95.74 |
| 4 | 2 | NONE | 94.02 |
| 5 | 1 | A | 92.86 |
| 6 | 5 | A | 90.38 |
| 7 | 1 | B | 90.29 |
| 8 | 3 | A | 90.04 |
| 9 | 1 | C | 89.25 |
| 10 | 5 | NONE | 86.86 |
| 11 | 1 | NONE | 86.83 |
| 12 | 3 | B | 86.62 |
| 13 | 5 | B | 86.24 |
| 14 | 9 | A | 83.85 |
| 15 | 3 | NONE | 82.43 |
| 16 | 3 | C | 79.85 |
| 17 | 4 | A | 79.45 |
| 18 | 6 | A | 79.06 |
| 19 | 5 | C | 77.59 |
| 20 | 9 | B | 75.20 |
| 21 | 4 | B | 73.87 |
| 22 | 9 | C | 70.74 |
| 23 | 6 | B | 70.47 |
| 24 | 4 | NONE | 69.74 |
| 25 | 6 | NONE | 69.32 |
| 26 | 7 | A | 67.70 |
| 27 | 4 | C | 67.29 |
| 28 | 8 | A | 63.82 |
| 29 | 9 | NONE | 63.28 |
| 30 | 7 | B | 59.61 |
| 31 | 6 | C | 55.36 |
| 32 | 8 | B | 53.99 |
| 33 | 7 | C | 43.10 |
| 34 | 7 | NONE | 42.23 |
| 35 | 8 | NONE | 34.33 |
| 36 | 8 | C | 23.65 |

***Thermoplastic size identified in Example 1.

TABLE 7

| PREPREG SAMPLE | FIBRE | SIZE++ |
|---|---|---|
| A1 | 1 | u |
| A2 | 1 | e |
| A3 | 1 | e + size C |
| B1 | 3 | u + size A |
| C1 | 5 | u |
| C2 | 5 | u + size B |
| D1 | 9 | u |
| D2 | 9 | e |
| D3 | 9 | u + size C |

++u = unsized fibre ) as in
e = epoxy compatible size fibre ) Table 1

Samples, 25 mm×25 mm, of the $[0,90]_{4s}$ laminates with their edges parallel to the fibre directions were subjected to thermal cycling (20 cycles) over the temperature range −196° C. to 350° C. The TVM density/inch was determined by sectioning the samples along the 45° direction; the sectioned face being polished prior to examination by scanning electron microscopy. Delamination was sometimes detected in addition to microcracking and was quantified as a percentage of the total laminate interply zone length.

The results of the TVM density/inch and delamination are shown in FIGS. 13 and 14, respectively.

The TFS of the $[0]_{16}$ laminates was carried out to ASTM D-790 using a three line bending test method modified for high modulus composites both on the as made samples and on conditioned samples, ie samples which had been heated at 350° C. in an air circulating oven for 150, 310 and 387 hours. The results are given in Table 8 below.

The TOS of selected samples was then determined as described in Example 2 at 350° C. for A2, A3, B1, C2 and D3 for 500 hours and at 316° C. for A2 and B1 for over 2500 hours. The TOS results are shown in FIGS. 15 and 16 respectively; wherein, in FIG. 15, the data for A2 is plotted using circles, for A3 using triangles, for B1 using stars, for C2 using bars and for D3 using squares; and wherein, in FIG. 16, the data for A2 is plotted using squares and for B1 using triangles.

TABLE 8

| | TFS (MPa) | % TFS RETAINED | | |
|---|---|---|---|---|
| SAMPLE | AS MADE | 150 HOURS | 310 HOURS | 387 HOURS |
| A1 | 76.4 | 63.42 | 41.23 | 48.84 |
| A2 | 91.2 | 58.41 | 36.51 | 35.36 |
| A3 | 94.0 | 58.00 | 39.26 | 34.31 |
| B1 | 67.6 | 54.67 | 36.98 | 41.51 |
| C1 | 72.5 | 62.54 | 26.59 | 21.71 |
| C2 | 81.6 | 59.08 | 23.25 | 20.53 |
| D1 | 76.6 | 63.17 | 39.82 | 39.18 |
| D2 | 69.6 | 60.36 | 39.25 | 35.62 |
| D3 | 81.5 | 44.56 | 21.29 | 17.21 |

As can be seen from the data presented in this Example 3, size A—sample B1—consistently gives good results. The TVM density/inch is relatively low and the delamination is non-existent—compare FIGS. 17 and 18, FIG. 17 being a micrograph of the thermally cycled B1 and FIG. 18 being a micrograph of the thermally cycled A2 which, also as mentioned above, is the primary commercially-used PMR-15/fibre combination; the TFS is comparable at least with D2 which, as mentioned above, is one of the commercially-used PMR-15/fibre combinations and the TFS is retained to a significant extent in the conditioned samples; and the TOS data, both at 500 hours and over 2500 hours, shows a significant improvement over A2.

Size B, which was used on a fibre supplied as unsized—sample C2, gave relatively poor TVM density/inch, delamination and TOS results but did give very good TFS results.

Size C, as used on a fibre supplied as unsized—sample D3, also gave relatively poor TVM density/inch, delamination and TOS results but good TFS results. On a fibre supplied as sized—sample A3, size C gave consistently good results, ie relatively low TVM density/inch and delamination, an improved TOS as compared to A2 and very good TFS and TFS retention results.

For some samples, short beam shear strength (SBSS), interlaminar toughness (ie between plies) and intralaminar toughness (ie between fibres at 90° to the plies) were determined. The samples and results are given below in Table 9.

The SBSS was determined in accordance with ASTM D2344-84 using a cross-head speed of 1 mm/min. The specimen is loaded in a three point bend fixture until a significant load drop is detected. The maximum load and type of failure are noted and the apparent interlaminar shear strength is then calculated.

The interlaminar toughness was determined using double cantilever beam specimens of width 20 mm and length 125 mm. A crack initiating foil of thickness less than 15μ is positioned between the mid-plies of the moulded specimen and extends at least 50 mm from the end of the specimen at which the crack is initiated. The specimens were tested using an Instron 6025 machine using a cross-head speed of 1 mm/min.

The intralaminar toughness was determined using samples cut from the split interlaminar toughness specimens, the width of the specimens being at least twice the thickness of the specimen. Notches were machined in the specimens and sharpened by tapping in a new razor blade to give notch tip radii of less than $1\mu$. The specimens were again tested using a cross-head speed of 1 mm/min.

TABLE 9

| SAMPLE | SBSS (MPa) | INTER-LAMINAR TOUGHNESS $G_{1c}$ Initiation (kJ/m$^2$) | Propagation (kJ/m$^2$) | INTRA-LAMINAR TOUGHNESS $K_{1c}$ (MN/m$^{-2/3}$) | $G_{1c}$ (kJ/m$^2$) |
|---|---|---|---|---|---|
| A1 | 90.1 | 0.39 | 0.42 | 1.60 | 0.42 |
| A2 | — | — | — | 1.45 | 0.46 |
| A3 | — | — | — | 1.52 | 0.73 |
| C1 | 96.5 | 0.41 | 0.41 | 1.42 | 0.37 |
| C2 | 86.3 | 0.26 | 0.32 | 1.44 | 0.39 |
| D1 | 94.4 | 0.28 | 0.34 | 1.60 | 0.41 |
| D2 | 94.5 | 0.23 | 0.23 | 1.42 | 0.31 |

EXAMPLE 4

The parameters for sizing the fibres with thermoplastic resin were determined by using various concentrations of thermoplastic resin in NMP and drying wetted fibre tows both above and below the boiling point of NMP. These experiments showed that, for effective sizing of the fibres, the concentration of the solution had to be not more than 0.25% w/v and the drying of the tow had to be above the boiling point of the NMP. Using conditions outside of these limits resulted in fibre tows which were preferentially coated with the thermoplastic resin around the outside of the tow rather than uniform sizing of the individual fibres.

EXAMPLE 5

A fibre T650-35, unsized and of diameter $6.8\mu$, was selected for sizing with thermoplastic polymer and impregnation with matrix resin and subsequent lamination. The prepreg samples made are summarised in Table 10.

The fibre tows were sized as described in Example 1 using a solution concentration of 0.125% w/v. As also observed in relation to the sized fibres described in Example 1, these processability of the thermoplastically-sized fibres was noticeably improved over the unsized equivalent. Additionally, during subsequent impregnation the thermoplastically-sized fibres appeared to wet out more easily than the unsized fibres.

TABLE 10

| PREPREG SAMPLE | SIZE++ |
|---|---|
| E1 | u |
| F1 | u + size A |
| G1 | u + size D* |
| H1 | u + size E** |
| J1 | u + size F*** |

++u = unsized fibre (as in Table 1).
*size D is the same polymer as size A but with chlorine end groups, a Tg = 255° C. and Mn = 10400.
**size E is a polymer having the following formula:-

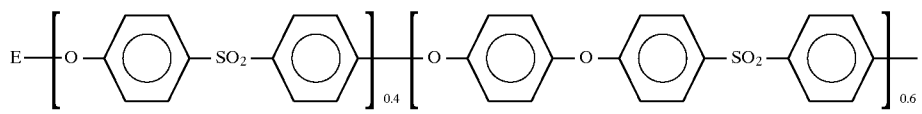

with amine end groups, a Tg = 190° C. and Mn = 13000.
***size F is a polymer having the following formula:-

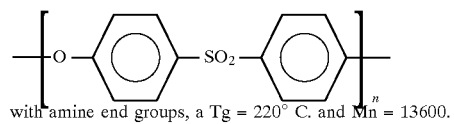

with amine end groups, a Tg = 220° C. and Mn = 13600.

The thermoplastically-sized fibre tows were then impregnated as described in Example 3 to achieve an areal weight of 145 g/m$^2$ and 40 wt % resin content using a PMR-type resin based on the dimethyl ester of 3,3',4,4'-benzophenone tetracarboxylic acid, p-phenylenediamine/ m-phenylenediamine (20:80) and the monoethyl ester of 5-norbornene in the molar ratio of 2.788:3.788:2 to give a formulated molecular weight of 1500 together with 2% by weight of N-phenylnadimide.

The prepregs were then laid up as $[0,90]_{4s}$ and $[0]_{16}$ 150 mm×100 mm laminates for transverse microcracking and transverse flexural strength (TFS) testing, respectively.

The imidization/cure and postcure cycles used were as shown in FIG. 19 (a), and (b), respectively.

Sample G1 delaminated during the moulding cycle and it was not possible to obtain samples upon which the tests could be done.

The TOS of samples E1, F1, H1 and J1 was examined at 350° C. and at 371° C. as described in Example 2. The results are given below in Tables 11 and 12 and are represented graphically in FIGS. 20 and 21 in which the data for E1 is plotted using unfilled squares, for F1 using filled diamonds, for H1 using filled squares and for J1 using filled diamonds.

TABLE 11

SAMPLE - % WT REMAINING AFTER TESTING AT 350° C.

| HOURS | E1 | F1 | H1 | J1 |
|---|---|---|---|---|
| 0 | 100.00 | 100.00 | 100.00 | 100.00 |
| 24 | 99.31 | 99.38 | 99.21 | 99.15 |
| 48 | 99.19 | 99.25 | 98.91 | 98.94 |
| 72 | 99.00 | 99.11 | 98.62 | 98.71 |
| 94 | 98.79 | 98.96 | 98.36 | 98.53 |
| 142 | 98.55 | 98.70 | 97.64 | 98.16 |
| 190 | 98.11 | 98.31 | 96.65 | 97.66 |
| 220 | 97.91 | 98.06 | 96.05 | 97.37 |
| 244 | 97.66 | 97.85 | 95.50 | 97.10 |
| 284 | 96.93 | 97.16 | 93.81 | 96.27 |
| 308 | 96.51 | 96.84 | 93.11 | 95.86 |

TABLE 12

SAMPLE - % WT REMAINING AFTER TESTING AT 371° C.

| HOURS | E1 | F1 | H1 | J1 |
|---|---|---|---|---|
| 0 | 100.00 | 100.00 | 100.00 | 100.00 |
| 24 | 98.86 | 98.95 | 98.71 | 98.56 |
| 48 | 98.44 | 98.41 | 97.91 | 97.98 |
| 72 | 97.99 | 97.85 | 96.86 | 97.27 |
| 94 | 97.25 | 97.04 | 95.35 | 96.36 |
| 142 | 95.14 | 94.24 | 90.17 | 92.98 |
| 190 | 92.57 | 91.00 | 85.05 | 88.66 |
| 220 | 91.24 | 89.32 | 82.95 | 86.33 |
| 244 | 90.01 | 87.85 | 81.31 | 84.18 |
| 284 | 86.79 | 84.38 | 78.30 | 78.76 |
| 308 | 85.17 | 82.73 | 76.95 | 76.57 |

Samples E1, F1, H1 and J1 were also subjected to TVM determinations as described in Example 3. The results are shown in FIG. 22. It should be noted no delaminations were present in any of the samples tested either before or after sampling.

The TFS of samples E1, F1, H1 and J1 was also determined as described in Example 3. The results are shown in Table 13 in terms of % TFS retained and in FIGS. 23 to 25 as a bar graph of the TFS obtained as made (FIG. 23) and as plots of the as made and after exposure to temperatures of 350° C. and 371° C. (FIGS. 24 and 25, respectively). In FIGS. 24 and 25, the data for E1 is plotted using stars, for F1 using unfilled triangles, for H1 using unfilled squares and for J1 using unfilled circles.

TABLE 13

| SAMPLE | TFS (MPa) AS MADE | % TFS RETAINED @ 350° C. | | % TFS RETAINED @ 371° C. | |
|---|---|---|---|---|---|
| | | 150 HOURS | 286 HOURS | 150 HOURS | 286 HOURS |
| E1 | 61.4 | 43.6 | 31.6 | 34.9 | 23.5 |
| F1 | 91.5 | 40.0 | 24.5 | 24.4 | 18.2 |
| H1 | 84.2 | 46.2 | 28.6 | 36.8 | 22.7 |
| J1 | 65.1 | 25.5 | 12.4 | 14.0 | 12.6 |

We claim:

1. A curable composite material comprising a thermosettable resin matrix and a continuous-fibre reinforcement impregnated by said matrix, the individual fibres of said reinforcement being sized with an amorphous aromatic thermoplastic resin selected to have a number average molecular weight in the range 1500 to 30000, comprising a polysulphone having end groups and/or pendent groups of formula —R—Z where R is a divalent hydrocarbon group and a Z is a group reactive with the thermosettable resin matrix or with a curing agent or with like groups of formula —R—Z on other polymer molecules, said polysulphone consisting essentially of ether- and/or thioether-linked repeating units selected from the group consisting of:

$(PhSO_2Ph)_{n1}$ and $(Ph)_a$ where Ph is phenylene, a and n1 are independently 1 to 2 and may on average be fractional and, when a exceeds 1, the phenylenes in $(Ph)_a$ are linked by a single chemical bond or a divalent group other than —$SO_2$—, provided that at least repeating units $(PhSO_2Ph)_{n1}$ are present in said polysulphone, wherein the amorphous, aromatic thermoplastic resin size on the fibres of said reinforcement substantially uniformly coats the fibres without significantly tacking the fibres together.

2. A curable composition according to claim 1 in which Ph is 1,4-phenylene.

3. A curable composition according to claim 1 in which the value of nl is such that on average at least two units $(PhSO_2Ph)_{nl}$ are in sequence in each polymer chain present.

4. A curable composition according to claim 1 in which nl has a value of about 1.5.

5. A curable composition according to claim 1 in which the fibres are carbon fibres.

6. A curable composition according to claim 1 in which the fibres are graphite fibres.

7. A curable composition according to claim 1 in which said matrix is selected from the group consisting of epoxy, cyanate, cyanate esters, bismaleimides, phenol-formaldehyde and polyimides.

8. A curable composition according to claim 1 in which the fibres of the reinforcement are carbon fibres and said matrix comprises addition polymerisation polyimide precursors.

9. A curable composition according to claim 1 in which, when the thermosetting resin matrix is epoxy, cyanate or cyanate ester, Z is selected from the group consisting of hydroxy, amine, cyanate, cyanate ester, epoxy, vinyl or ethynyl and in which, when said thermosettable resin matrix is bismaleimide, phenolformaldehyde or polyimide, Z is selected from the group consisting of nadimide, maleimide, amine, anhydride, vinyl or ethynyl.

10. A curable composition according to claim 1 in which said thermoplastic resin is selected to have a number average molecular weight in the range 3000 to 20000.

11. A curable composition according to claim 1 in which said thermoplastic resin is selected to have a number average molecular weight in the range 3000 to 15000.

12. A curable composition according to claim 1 in which said thermoplastic resin has a Tg of at least 80° C.

13. A curable composition according to claim 1 in which said thermoplastic resin has a Tg of at least 100° C.

14. A curable composition according to claim 1 in which said thermoplastic resin has a Tg of at least 150° C.

15. A curable composition according to claim 1 in which said thermoplastic resin has a Tg of at least 200° C.

16. A curable composition according to claim 1 in which said thermoplastic resin has a Tg of at least 240° C.

17. Continuous fibers for use in composite materials comprising an amorphous, aromatic thermoplastic resin size according to any one of claims 1 to 16.

18. A shaped article comprising a composition according to any one of claims 1 to 16 which has been cured.

19. A process of making a composite material according to any one of claims 1 to 9 comprising passing the fibres through a solution of said thermoplastic resin which has a number average molecular weight in the range 1500 to 30000 and the concentration of said thermoplastic resin in said solution being no greater than 0.25% w/v to wet the fibres with said solutions, drying the wetted fibres at a temperature greater than the boiling point of the solvent forming the solution and impregnating the resultant sized fibres with a thermosetting resin.

20. A process of sizing fibres with an amorphous, aromatic thermoplastic resin comprising passing the fibres through a solution of a thermoplastic resin selected to have a number average molecular weight in the range 1500 to 30000, comprising a polysulphone having end groups and/or pendent groups of formula —R—Z where R is a divalent hydrocarbon group and Z is a group reactive with the thermosettable resin matrix or with a curing agent or with like groups of formula —R—Z on other polymer molecules, said polysulphone consisting essentially of ether- and/or thioether-linked repeating units selected from the group consisting of:

and

where Ph is phenylene, a and n1 are independently 1 to 2 and may on average be fractional and, when a exceeds 1, the phenylenes in $(Ph)_a$ are linked by a single chemical bond or a divalent group other than —$SO_2$—, provided that at least repeating units $(PhSO_2Ph)_{n1}$ are present in said polysulphone, said thermoplastic resin having a number average molecular weight in the range 1500 to 30000 and the concentration of said thermoplastic resin in said solution being no greater than 0.25% w/v to wet the fibres with said solution so that the thermoplastic resin size on the fibres of said reinforcement substantially uniformly coats the fibres without significantly tacking the fibres together, and drying the wetted fibres at a temperature greater than the boiling point of the solvent forming the solution.

21. A process according to claim 20 in which said thermoplastic resin has a number average weight in the range 3000 to 20000.

22. A process according to claim 20 in which said thermoplastic resin has a number average weight in the range 3000 to 15000.

* * * * *